US012764718B2

(12) United States Patent
Sarkis et al.

(10) Patent No.: US 12,764,718 B2
(45) Date of Patent: Oct. 13, 2026

(54) CONDITIONAL RECEPTION AVAILABILITY FOR SIDELINK COMMUNICATIONS

(71) Applicant: QUALCOMM Incorporated, San Diego, CA (US)

(72) Inventors: Gabi Sarkis, San Diego, CA (US); Seyedkianoush Hosseini, San Diego, CA (US); Tien Viet Nguyen, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 367 days.

(21) Appl. No.: 17/662,000

(22) Filed: May 4, 2022

(65) Prior Publication Data

US 2022/0361148 A1 Nov. 10, 2022

Related U.S. Application Data

(60) Provisional application No. 63/185,845, filed on May 7, 2021.

(51) Int. Cl.

| | |
|---|---|
| ***H04W 4/00*** | (2018.01) |
| ***H04L 5/00*** | (2006.01) |
| ***H04L 5/16*** | (2006.01) |
| ***H04W 72/02*** | (2009.01) |
| ***H04W 72/56*** | (2023.01) |

(52) U.S. Cl.

CPC ........... *H04W 72/02* (2013.01); *H04L 5/0053* (2013.01); *H04L 5/16* (2013.01); *H04W 72/56* (2023.01)

(58) Field of Classification Search

None

See application file for complete search history.

(56) References Cited

U.S. PATENT DOCUMENTS

| | | | | |
|---|---|---|---|---|
| 2022/0030575 | A1* | 1/2022 | Farag | H04L 5/0053 |
| 2022/0086803 | A1* | 3/2022 | Li | H04W 72/0453 |
| 2022/0094484 | A1* | 3/2022 | Babaei | H04W 72/1263 |
| 2022/0330267 | A1* | 10/2022 | Hui | H04B 17/327 |

FOREIGN PATENT DOCUMENTS

| | | | | |
|---|---|---|---|---|
| WO | WO-2022122422 A1 * | 6/2022 | | H04L 1/1848 |
| WO | WO-2022147228 A1 * | 7/2022 | | H04W 72/02 |
| WO | WO-2022155424 A1 * | 7/2022 | | H04W 72/20 |

OTHER PUBLICATIONS

3GPP: "RAN1 Chair's Notes", 3GPP Draft, 3GPP TSG RAN WG1 #106bis-e, Version 19, e-Meeting, Oct. 11-19, 2021, 136 Pages.

EGPP: "RAN1 Chair's Notes", 3GPP Draft, 3GPP TSG RAN WG1 #106-e, Version 24, e-Meeting, Aug. 16-27, 2021, 146 Pages.

(Continued)

*Primary Examiner* — Zewdu A Beyen

(74) *Attorney, Agent, or Firm* — Harrity & Harrity LLP/ QUALCOMM Incorporated

(57) ABSTRACT

Various aspects of the present disclosure generally relate to wireless communication. In some aspects, a first user equipment (UE) may receive, from a second UE, coordination information indicating a non-preferred sidelink resource. The UE may transmit a communication on the non-preferred sidelink resource when a condition associated with the communication is satisfied. Numerous other aspects are described.

32 Claims, 14 Drawing Sheets

(56) References Cited

OTHER PUBLICATIONS

3GPP#108-e, Version 27, e-Meeting, Feb. 21-Mar. 3, 2022, 156 Pages.
Nokia: "Corrections on NR Sidelink Enhancements", 3GPP Draft, 3GPP TSG-RAN WG1 Meeting #108-e, R1-2202963, Electronic Meeting, Feb. 21-Mar. 3, 2022, 11 Pages.
Apple: "Inter-UE Coordination for Mode 2 Resource Allocation", 3GPP TSG RAN WG1 #104-e, R1-2101358, e-Meeting, Jan. 25-Feb. 5, 2021, XP051971026, pp. 1-8, Sections 1-2, Section 2, Feb. 5, 2021 (Feb. 5, 2021).
International Search Report and Written Opinion—PCT/US2022/072125—ISA/EPO—Aug. 8, 2022.
LG Electronics: "Discussion on Resource Allocation for Power Saving", 3GPP Draft, 3GPP TSG RAN WG1 Meeting #104-e, R1-2100517, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021 Jan. 19, 2021 (Jan. 19, 2021), XP051971026, pp. 1-20, paragraphs [0001]—[02.5].
Mitsubishi Electric: "Inter-UE Coordination for Enhanced Resource Allocation", 3GPP Draft, 3GPP TSG RAN WG1 #104-e, R1-2100828, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 18, 2021 (Jan. 18, 2021), XP051970565, 12 Pages.

* cited by examiner

CONDITIONAL RECEPTION AVAILABILITY FOR SIDELINK COMMUNICATIONS

CROSS-REFERENCE TO RELATED APPLICATION

This Patent Application claims priority to U.S. Provisional Patent Application No. 63/185,845, filed on May 7, 2021, entitled "CONDITIONAL RECEPTION AVAILABILITY FOR SIDELINK COMMUNICATIONS," and assigned to the assignee hereof. The disclosure of the prior Application is considered part of and is incorporated by reference into this Patent Application.

INTRODUCTION

Aspects of the present disclosure generally relate to wireless communication and to techniques and apparatuses for conditional reception availability.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a base station via the downlink and uplink. The downlink (or forward link) refers to the communication link from the base station to the UE, and the uplink (or reverse link) refers to the communication link from the UE to the base station. As will be described in more detail herein, a base station may be referred to as a Node B, a gNB, an access point (AP), a radio head, a transmit receive point (TRP), a New Radio (NR) base station, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a first user equipment (UE) includes receiving, from a second UE, coordination information indicating a non-preferred sidelink resource. The method may include the first UE transmitting a communication on the non-preferred sidelink resource when a condition associated with the communication is satisfied.

In some aspects, a method of wireless communication performed by a first UE includes transmitting, to a second UE, coordination information indicating a non-preferred sidelink resource. The method may include the first UE receiving a communication on the non-preferred sidelink resource from the second UE when a condition associated with the communication is satisfied.

In some aspects, a first UE for wireless communication includes a memory; and one or more processors configured to receive, from a second UE, coordination information indicating a non-preferred sidelink resource. The one or more processors may be further configured to transmit a communication on the non-preferred sidelink resource when a condition associated with the communication is satisfied.

In some aspects, a first UE for wireless communication includes a memory; and one or more processors configured to transmit, to a second UE, coordination information indicating a non-preferred sidelink resource. The one or more processors may be further configured to receive a communication on the non-preferred sidelink resource from the second UE when a condition associated with the communication is satisfied.

In some aspects, a non-transitory computer-readable medium storing a set of instructions for wireless communication includes one or more instructions that, when executed by one or more processors of a first UE, cause the first UE to receive, from a second UE, coordination information indicating a non-preferred sidelink resource. The one or more instructions that, when executed by one or more processors of a first UE, may further cause the first UE to transmit a communication on the non-preferred sidelink resource when a condition associated with the communication is satisfied.

In some aspects, a non-transitory computer-readable medium storing a set of instructions for wireless communication includes one or more instructions that, when executed by one or more processors of a first UE, cause the first UE to transmit, to a second UE, coordination information indicating a non-preferred sidelink resource. The one or more instructions that, when executed by one or more processors of a first UE, may further cause the first UE to receive a communication on the non-preferred sidelink resource from the second UE when a condition associated with the communication is satisfied.

In some aspects, an apparatus for wireless communication includes means for receiving, from a second UE, coordination information indicating a non-preferred sidelink resource. The apparatus may further include means for transmitting a communication on the non-preferred sidelink resource when a condition associated with the communication is satisfied.

In some aspects, an apparatus for wireless communication includes means for transmitting, to a second UE, coordination information indicating a non-preferred sidelink resource. The apparatus may further include means for receiving, from the second UE a communication on the non-preferred sidelink resource when a condition associated with the communication is satisfied.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
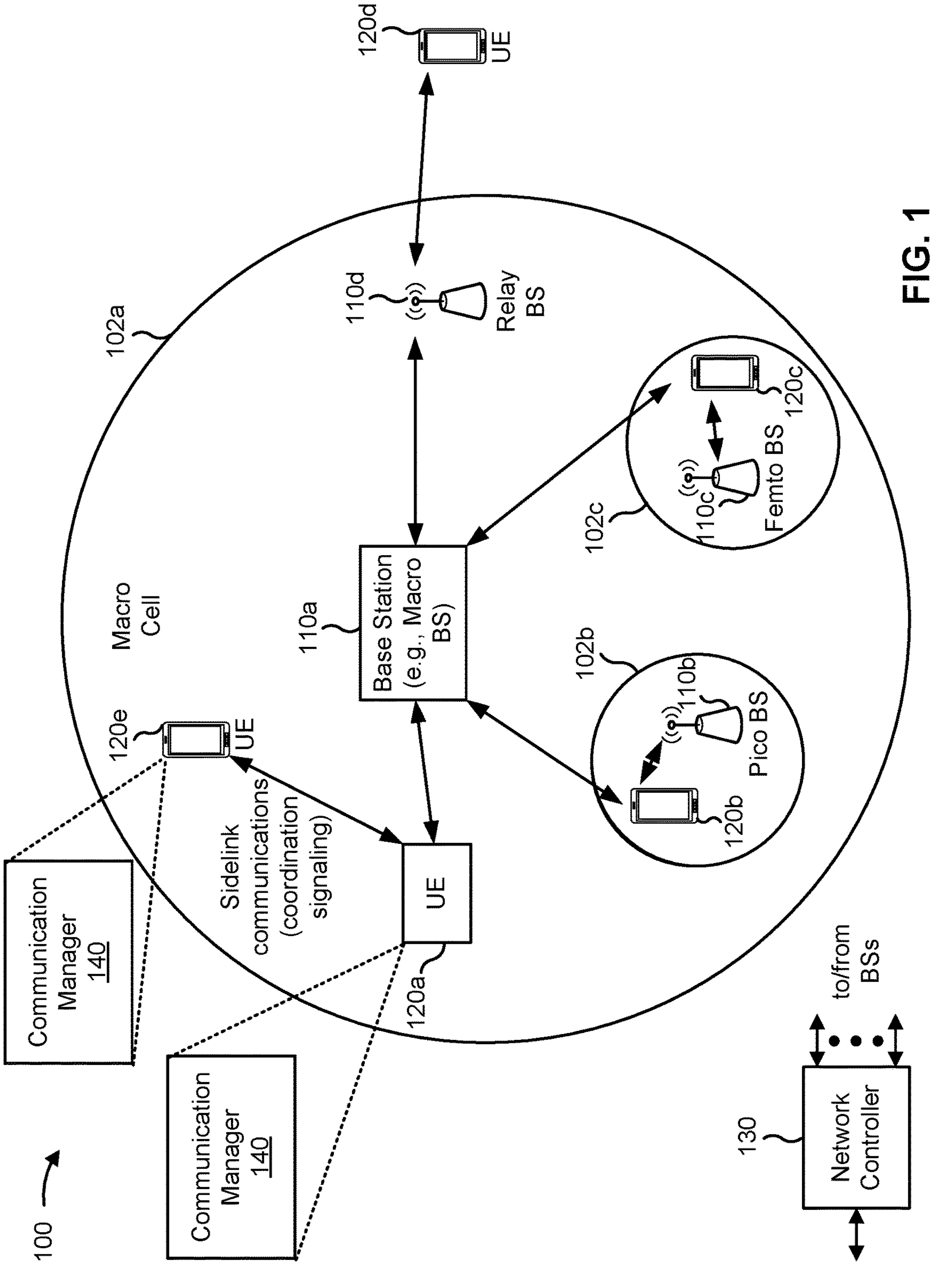
FIG. 1 is a diagram illustrating an example of a wireless network, in accordance with the present disclosure.

A first user equipment (UE) may communicate with a second UE via a sidelink channel. A sidelink channel is a channel for communications directly between UEs without such communications being routed via a base station. The UEs may operate using a transmission mode where resource selection and/or scheduling for communicating via the sidelink channel is performed by the UEs (e.g., rather than a base station). In some aspects, the first UE and the second UE may perform inter-UE coordination. In inter-UE coordination, the first UE may provide coordination information to the second UE. The coordination information is information indicating preferred and/or non-preferred sidelink resources for transmission by the second UE. The coordination information may aid in selecting sidelink resources (so as to reduce or avoid collision) for a sidelink transmission of the second UE. For example, the first UE may determine a set of sidelink resources available for a resource allocation or selection and may transmit coordination information including an indication (e.g., a set of resource identifiers, such as a sub-channel index, an indication of a time resource, a frequency domain or the like) of the set of sidelink resources to the second UE. In some aspects, the indication of the set of sidelink resources may identify resources that are selected by the first UE as preferred for communications performed by the second UE, referred to herein as preferred sidelink resources. Additionally, or alternatively, the indication of the set of sidelink resources may identify resources that are selected by the first UE as not preferred for transmissions performed by the second UE, referred to herein as non-preferred sidelink resources. The indication of preferred resources and/or non-preferred resources by the first UE may improve resource selection at the second UE by enabling the second UE to take into account conditions at the first UE which might render a resource particularly suitable or unsuitable for the communications of the second UE (where these conditions may not be apparent at the second UE alone).

A non-preferred sidelink resource, from the first UE's perspective, is a resource that is not selected for receiving a communication from the second UE. In some aspects, a non-preferred sidelink resource is a resource that is associated with a condition that renders the non-preferred sidelink resource unsuitable, from the first UE's perspective, for a communication by the second UE. For example, a non-preferred sidelink resource, from the first UE's perspective, may be in a slot where the first UE is scheduled to perform a communication (whether an uplink communication or a sidelink communication) and, therefore, cannot receive a communication due to half duplex constraints, a resource that overlaps, in the time and/or frequency domain, with one or more resources corresponding to a scheduled downlink or sidelink communication, or a resource that is in a time period during which the first UE is unable to receive communications due to a power saving configuration (e.g., such as a resource that is in an off duration of a discontinuous reception (DRX) cycle), among other examples. A preferred sidelink resource, from the first UE's perspective, is a resource that can be selected for receiving a communication from the second UE. In some aspects, a preferred sidelink resource is a resource that is not associated with a condition that renders the preferred sidelink resource unsuitable, from the first UE's perspective, for a communication by the second UE. In some aspects, a preferred sidelink resource is a resource that the first UE has determined is not associated with a scheduled communication, a half duplex constraint, a power saving configuration, or the like.

Additionally, the first UE may transmit coordination information to the second UE. The coordination information is information indicating preferred and/or non-preferred sidelink resources for transmission by the second UE. The coordination information may aid in selecting sidelink resources (so as to reduce or avoid collision) for a sidelink transmission of the second UE.

The first UE may transmit the indication of the set of available sidelink resources and the coordination information to the second UE via inter-UE coordination signaling. "Inter-UE coordination signaling," "coordination information," and "inter-UE coordination information" are used interchangeably herein. Inter-UE coordination signaling related to resource allocation or selection may reduce collisions between the first UE and the second UE and may reduce a power consumption for the first UE and/or the second UE (e.g., due to fewer retransmissions as a result of fewer collisions). However, inter-UE coordination signaling related to resource allocation or selection may not provide an exception for high priority communications to be transmitted by the second UE on a non-preferred resource as indicated by the first UE. For example, the first UE may indicate a resource as non-preferred for the second UE, but the resource may be associated with a high priority communication to be transmitted by the second UE. If the second UE were to adhere to the first UE's indication of non-preferred resources without taking into account priority levels of communications at the second UE, the second UE may skip or delay transmission of high priority traffic, leading to decreased throughput and interruption of high priority services (due to the second UE adhering to the indication of the non-preferred resource and foregoing transmission or reception of a high priority communication). The decreased throughput and interruption of high priority service may hamper adherence to quality of service requirements, which may provide strict latency requirements and/or reliability requirements that may be violated if an indication of a non-preferred resource is adhered to rather than performing a high priority communication.

In some aspects, described herein, the second UE may select a non-preferred sidelink resource for a communication in response to a condition associated with the communication being satisfied. The condition may be associated with a priority associated with the communication, a packet delay budget of the communication, and/or the like. In some aspects, the condition may be pre-configured (e.g., based at least in part on a condition specified in a wireless communication standard) and/or configured by the first UE. In some other aspects, the condition may be configured and/or pre-configured per sidelink resource, per a pool of sidelink resources (e.g., per sidelink resource pool), or the like. For example, a first condition may be configured and/or re-configured for a first sidelink resource and a second condition may be configured and/or pre-configured for a second sidelink resource. In some aspects, a number of conditions may be configured and/or pre-configured for a number of sidelink resources, individually. Similarly, in some aspects, a first condition may be configured and/or pre-configured for a first pool of sidelink resources and a second condition may be configured and/or pre-configured for a second pool of sidelink resources. Techniques described herein provide conditions for selecting non-preferred resources and signaling associated with selection of non-preferred resources. In this way, the second UE can take into account conditions for selecting non-preferred resources when determining whether to follow an indication of a non-preferred resource designated by the first UE, which improves adherence to quality of service requirements (by facilitating transmission or reception of high priority communications in non-preferred resources), increases throughput (by reducing the occurrence of skipped or delayed high priority transmissions), and improves communication performance (by reducing the occurrence of skipped or delayed high priority transmissions).

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G NR network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with UEs and may also be referred to as an NR BS, a Node B, a gNB, a 5G node B (NB), an access point, a transmit receive point (TRP), or the like. Each base station may provide communication coverage for a particular geographic area. In 3GPP, the term "cell" can refer to a coverage area of a base station and/or a base station subsystem serving this coverage area, depending on the context in which the term is used.

A base station may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A base station for a macro cell may be referred to as a macro base station. A base station for a pico cell may be referred to as a pico base station. A base station for a femto cell may be referred to as a femto base station or a home base station. In the example shown in FIG. 1, a base station 110*a* may be a macro base station for a macro cell 102*a*, a base station 110*b* may be a pico base station for a pico cell 102*b*, and a base station 110*c* may be a femto base station for a femto cell 102*c*. A base station may support one or multiple (e.g., three) cells. The terms "eNB", "base station", "NR base station", "gNB", "TRP", "AP", "node B", "5G NB", and "cell" may be used interchangeably herein.

In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a base station or a UE) and send a transmission of the data to a downstream station (e.g., a UE or a base station). A relay station may also be a UE that can relay transmissions for other UEs. In the example shown in FIG. 1, a relay base station 110*d* may communicate with macro base station 110*a* and a UE 120*d* in order to facilitate communication between base station 110*a* and UE 120*d*. A relay base station may also be referred to as a relay station, a relay base station, a relay, or the like.

Wireless network 100 may be a heterogeneous network that includes base stations of different types, such as macro base stations, pico base stations, femto base stations, relay base stations, or the like. These different types of base stations may have different transmit power levels, different coverage areas, and different impacts on interference in wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to a set of base stations and may provide coordination and control for these base stations. Network controller 130 may communicate with the base stations via a backhaul. The base stations may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In some aspects, the UE 120 may perform scheduling operations, resource selection operations, and/or other operations described elsewhere herein as being performed by the base station 110.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a “Sub-6 GHz” band in various documents and articles. A similar nomenclature issue sometimes occurs with regard to FR2, which is often referred to (interchangeably) as a “millimeter wave” band in documents and articles, despite being different from the extremely high frequency (EHF) band (30 GHz-300 GHz) which is identified by the International Telecommunications Union (ITU) as a “millimeter wave” band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term “sub-6 GHz” or the like if used herein may broadly represent frequencies that may be less than 6 GHz, may be within FR1, or may include mid-band frequencies. Further, unless specifically stated otherwise, it should be understood that the term “millimeter wave” or the like if used herein may broadly represent frequencies that may include mid-band frequencies, may be within FR2, FR4, FR4-a or FR4-1, and/or FR5, or may be within the EHF band.

In some aspects, the UE 120 may include a communication manager 140. As described in more detail elsewhere herein, the communication manager 140 may perform one or more operations associated with sidelink communications. Additionally, or alternatively, the communication manager 140 may perform one or more other operations described herein.

In some aspects, the term “base station” (e.g., the base station 110) or “network node” or “network entity” may refer to an aggregated base station, a disaggregated base station (e.g., described in connection with FIG. 9), an integrated access and backhaul (IAB) node, a relay node, and/or one or more components thereof. For example, in some aspects, “base station,” “network node,” or “network entity” may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term “base station,” “network node,” or “network entity” may refer to one device configured to perform one or more functions, such as those described herein in connection with the base station 110. In some aspects, the term “base station,” “network node,” or “network entity” may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term “base station,” “network node,” or “network entity” may refer to any one or more of those different devices. In some aspects, the term “base station,” “network node,” or “network entity” may refer to one or more virtual base stations and/or one or more virtual base station functions. For example, in some aspects, two or more base station functions may be instantiated on a single device. In some aspects, the term “base station,” “network node,” or “network entity” may refer to one of the base station functions and not another. In this way, a single device may include more than one base station.

As indicated above, FIG. 1 is provided as an example. Other examples may differ from what is described with regard to FIG. 1.

Figure 2:
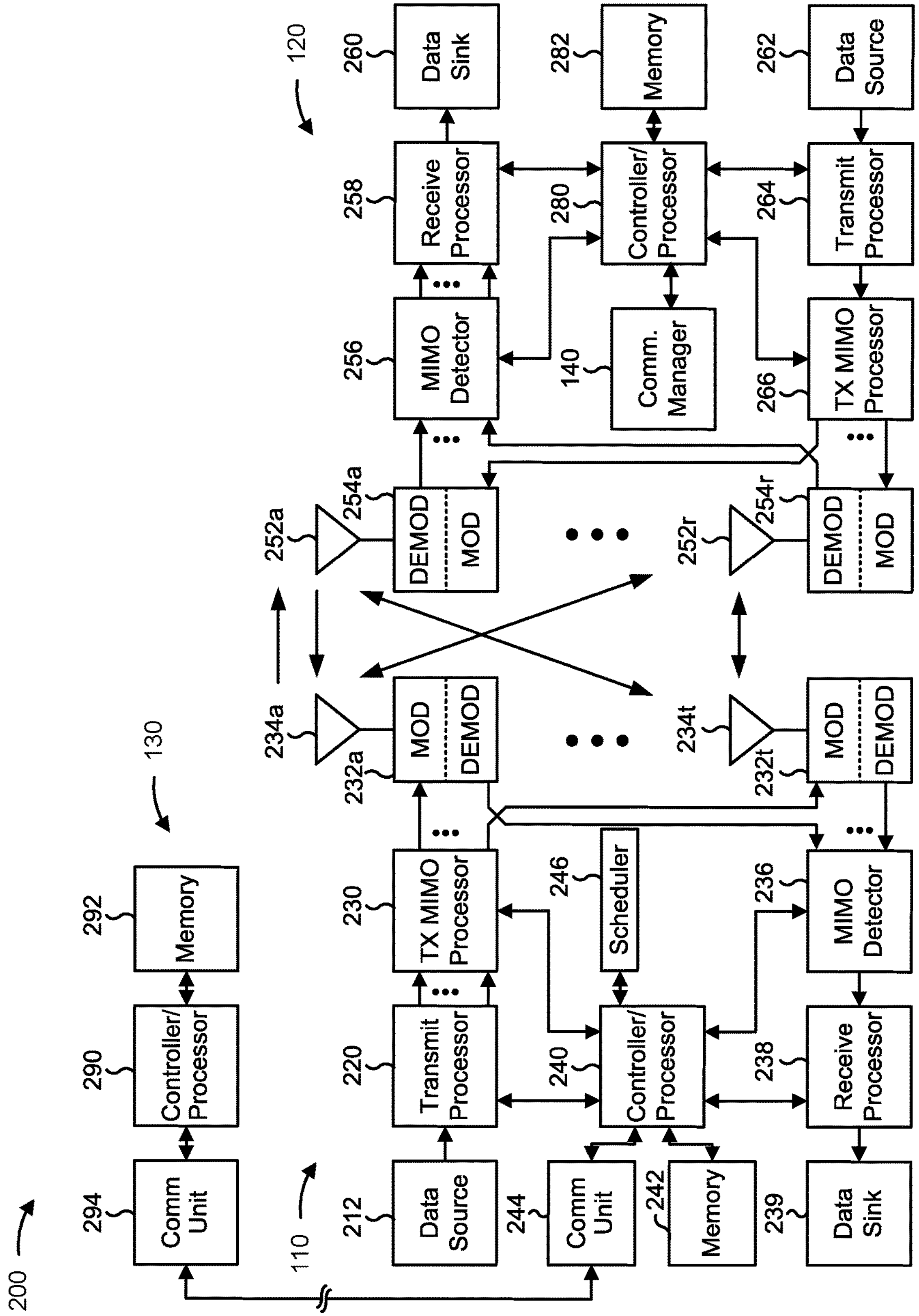
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports comprising RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with conditional reception availability for sidelink communications, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, a first UE (e.g., UE 120) includes means for receiving, from a second UE, coordination information indicating a non-preferred sidelink resource; and/or means for transmitting a communication on the non-preferred sidelink resource when a condition associated with the communication is satisfied. The means for the first UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, a first UE (e.g., UE 120, the second UE described immediately above) includes means for transmitting, to a second UE, coordination information indicating a non-preferred sidelink resource; and/or means for receiving, from the second UE a communication on the non-preferred sidelink resource when a condition associated with the communication is satisfied. The means for the first UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
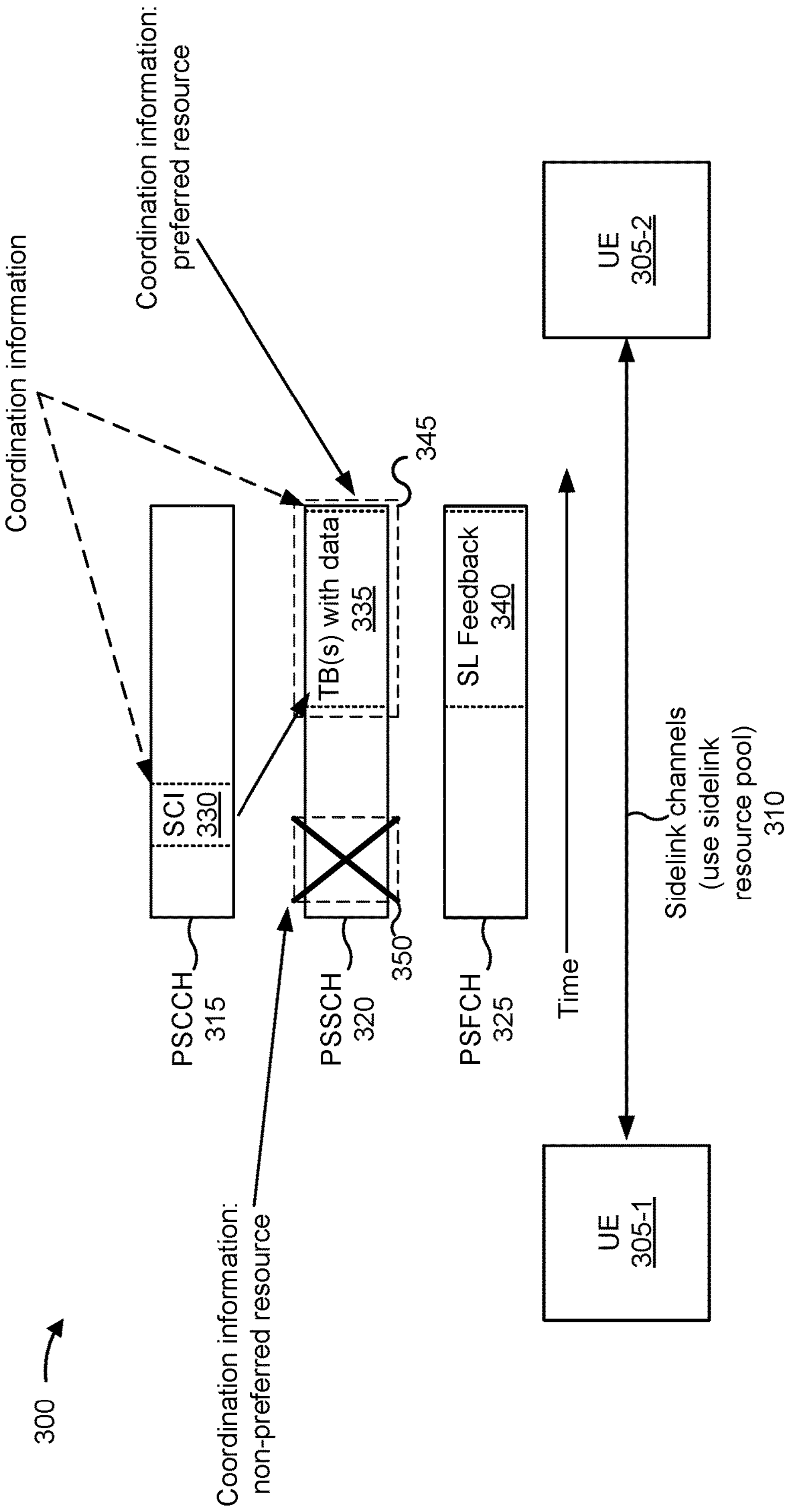
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for communications via a wireless location area network (such as a WiFi network), communications via a personal area network (such as a Bluetooth network), P2P communications, D2D communications, V2X communications (e.g., which may include V2V communications, V2I communications, and/or vehicle to pedestrian (V2P) communications) and/or mesh networking. In some aspects, the UEs 305 (e.g., UE 305-1 and/or UE 305-2) may be one or more other UEs described elsewhere herein, such as UE 120. In some aspects, the one or more sidelink channels 310 may use a PC5 interface and/or may operate in a high frequency band (e.g., the 5.9 GHz band). In some other aspects, the one or more sidelink channels 310 may use another form of interface, such as a WiFi interface, a Bluetooth interface, or the like. It should be understood that the techniques described herein are not limited to NR sidelink communications (unless explicitly noted otherwise) and can be applied for other forms of communication without a central scheduler. In some aspects, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. In some aspects, the PSCCH may be used to communicate coordination information between the UEs 305. As described in greater detail herein, the coordination information transmitted by a UE 305 to another UE 305 indicates preferred or non-preferred resources for transmission by the other UE 305.

The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), and/or a scheduling request (SR). In some aspects, the PSSCH 320 may carry medium access control (MAC) signaling. In some aspects, the PSSCH 320 or the PSCCH 315 may carry radio resource control (RRC) signaling, such as RRC signaling originating from a PC5-RRC protocol entity.

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, coordination information such as an indication of a non-preferred resource (described elsewhere herein), and/or an MCS. The SCI-2 may include information associated with data transmissions on the PSSCH 320, such as a HARQ process ID, a new data indicator (NDI), a source identifier, a destination identifier, coordination information such as an indication of a non-preferred resource (described elsewhere herein), and/or a channel state information (CSI) report trigger.

In some aspects, the one or more sidelink channels 310 may use resource pools. A resource pool is a configured set of resources, associated with a sidelink connection, for communication on the sidelink connection. Resource pools can be configured with various parameters, described elsewhere herein. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy ratio (CBR) associated with various sidelink channels, which may be used for rate control (e.g., by indicating a maximum number of RBs that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more RBs to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

In some aspects, as shown, a first UE 305-1 may transmit coordination information to a second UE 305-2, such as via the PSCCH 315, the PSSCH 320, PC5-RRC signaling, and/or MAC signaling. The coordination information may aid in selecting resources (so as to reduce or avoid collision) for a sidelink transmission of the second UE 305-2.

In some aspects, the coordination information may indicate preferred resources 345 for transmission by the second UE 305-2. Additionally, or alternatively, the coordination information may indicate non-preferred resources 350 for transmission by the second UE 305-2. For example, the coordination information may indicate a non-preferred sidelink resource. In some aspects, the coordination information may indicate that the second UE 305-2 is to avoid transmitting on the non-preferred resource. As shown here, in some aspects, the second UE 305-2 may avoid transmitting on the non-preferred resource. In some aspects, the coordination information may identify one or more criteria associated with transmitting a communication on the non-preferred sidelink resource. For example, the coordination may indicate that a communication can be transmitted on the non-preferred sidelink resource when a priority associated with the communication satisfies a priority threshold, when a packet delay budget associated with the communication is below a threshold, and/or the like.

As indicated above, FIG. 3 is provided as an example. Other examples may differ from what is described with respect to FIG. 3.

Figure 4:
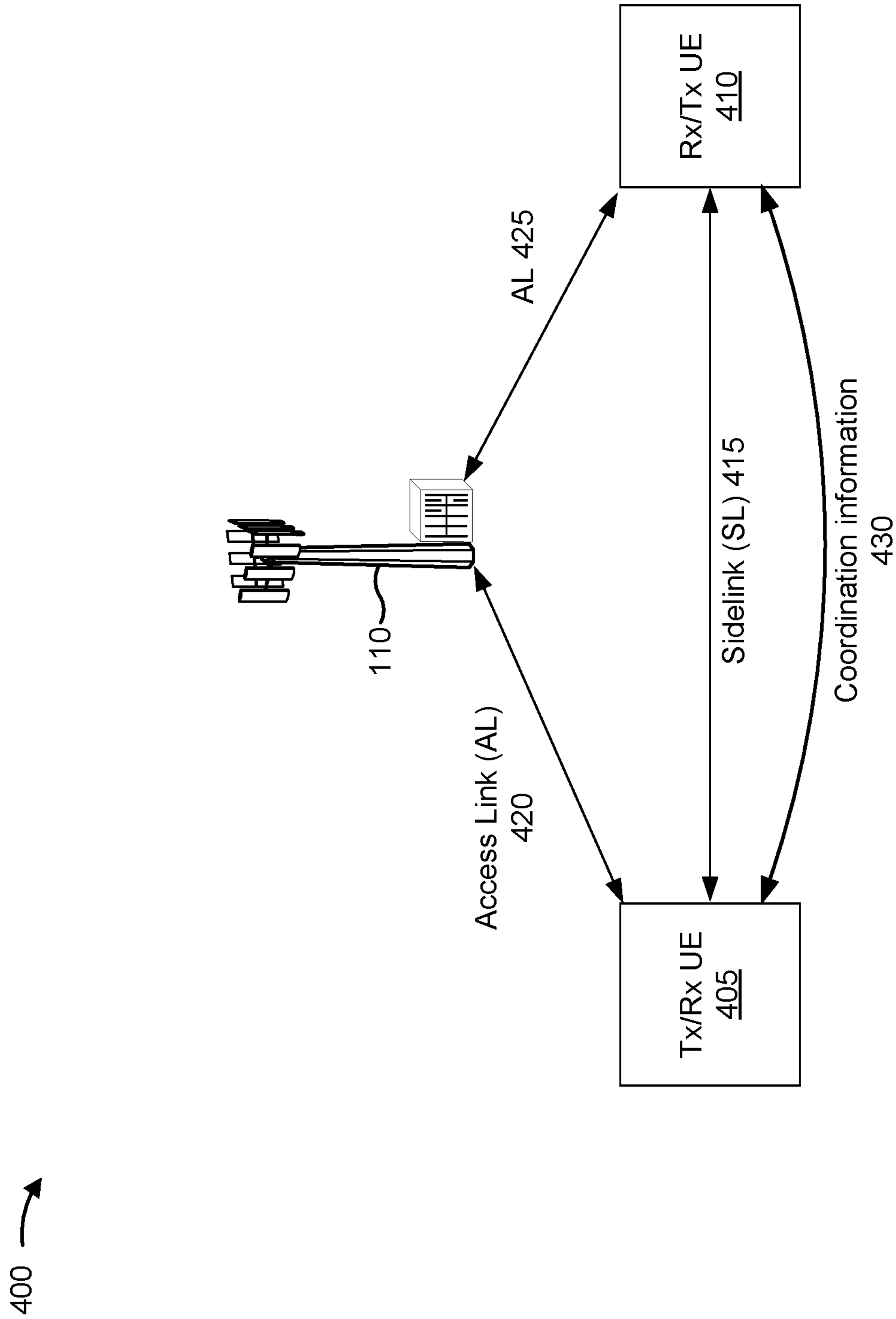
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure. As mentioned in connection with FIG. 3, the techniques described herein are not limited to implementations involving NR sidelink communications.

As shown in FIG. 4, a transmitter (Tx)/receiver (Rx) UE 405 and an Rx/Tx UE 410 may communicate with one another via a sidelink 415, as described above in connection with FIG. 3. As further shown, in some sidelink modes, a base station 110 may communicate with the Tx/Rx UE 405 via a first access link 420. Additionally, or alternatively, in some sidelink modes, the base station 110 may communicate with the Rx/Tx UE 410 via a second access link 425. The Tx/Rx UE 405 and/or the Rx/Tx UE 410 may correspond to one or more UEs described elsewhere herein, such as the UE 120 of FIG. 1 or the UE 305 of FIG. 3. Thus, a direct link between UEs 120 (e.g., via a PC5 interface, a Bluetooth interface, a WiFi interface, or the like) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

In some aspects, as shown in FIG. 4 by reference number 430, the sidelink may carry coordination information. The coordination information may be transmitted by one UE (e.g., UE 405) to another UE 120 (e.g., UE 410) and may indicate preferred or non-preferred resources for transmission by the other UE 120, as described elsewhere herein.

As indicated above, FIG. 4 is provided as an example. Other examples may differ from what is described with respect to FIG. 4.

Figure 5:
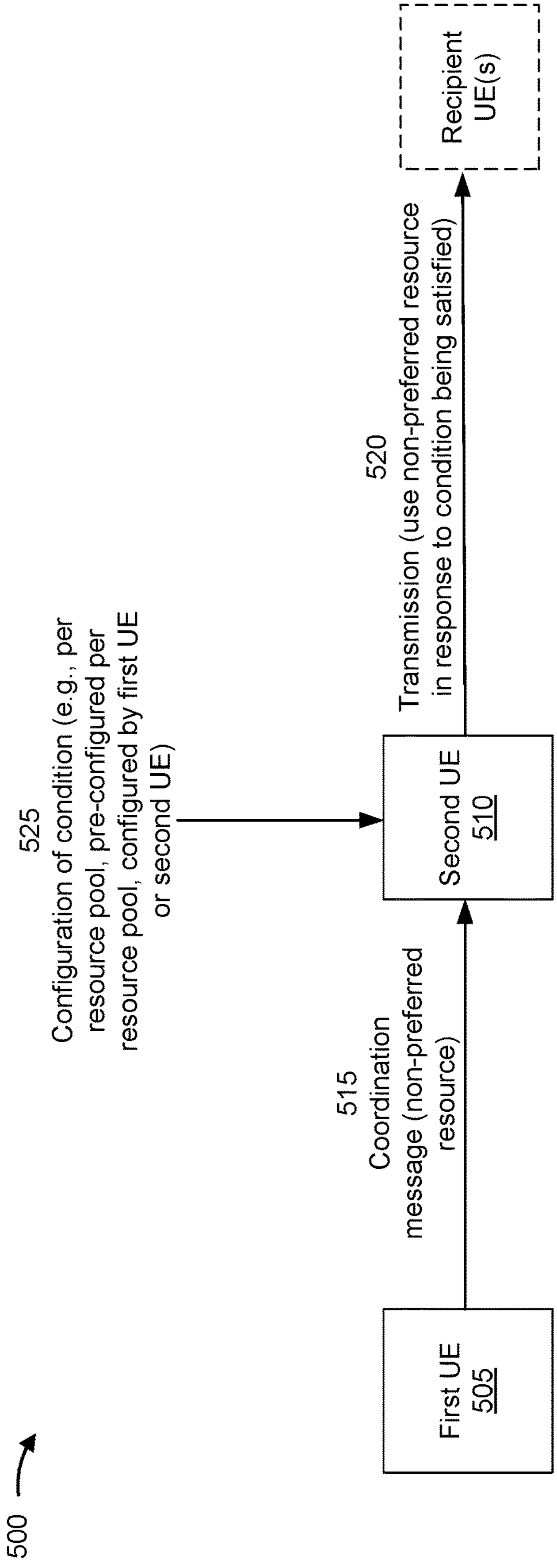
FIG. 5 is a diagram illustrating an example of coordination signaling, in accordance with the present disclosure.

FIG. 5 is a diagram illustrating an example 500 of coordination signaling, in accordance with the present disclosure.

In example 500, a first UE 505 (e.g., UE 120*a* of FIG. 1, UE 305-1 of FIG. 3, or UE 405 of FIG. 4) exchanges inter-UE coordination signaling with a second UE 510 (e.g., UE 120*e* of FIG. 1, UE 305-2 of FIG. 3, or UE 410 of FIG. 4). The inter-UE coordination signaling may carry coordination information, sometimes referred to as inter-UE coordination information. "Inter-UE coordination signaling," "coordination information," and "inter-UE coordination information" are used interchangeably herein. The first UE 505 and the second UE 510 may operate in an in-coverage mode, a partial coverage mode, or an out-of-coverage mode with a base station 110. In the in-coverage mode, the first UE 505 and the second UE 510 are covered by the base station 110. In the partial coverage mode, one of the first UE 505 and the second UE 510 is covered by the base station 110. In the out-of-coverage mode, neither of the first UE 505 nor the second UE 510 are covered by the base station 110.

The first UE 505 may determine a set of sidelink resources available for a resource allocation or selection. The first UE 505 may determine the set of sidelink resources based at least in part on determining that the set of sidelink resources are to be selected or based at least in part on a request, referred to herein as an inter-UE coordination request, received from the second UE 510 or a base station 110. In some aspects, the first UE 505 may determine the set of sidelink resources based at least in part on a sensing operation, which may be performed before receiving an inter-UE coordination request or after receiving the inter-UE coordination request.

As shown by reference number 515, the first UE 505 may transmit an indication of the set of available resources to the second UE 510 via inter-UE coordination signaling (shown as a coordination message, and referred to in some aspects as an inter-UE coordination message or inter-UE coordination information). In some aspects, the first UE 505 may transmit the indication of the set of available resources while operating in sidelink resource allocation mode 2. In sidelink resource allocation mode 2, resource allocation or selection is handled by UEs (e.g., in comparison to sidelink resource allocation mode 1, in which resource allocation or selection is handled by a scheduling entity, such as a base station 110). In some aspects, the indication of the set of sidelink resources may identify resources that are preferred by the first UE for transmissions by the second UE, referred to herein as preferred sidelink resources. Additionally, or alternatively, the indication of the set of sidelink resources may identify resources that are not preferred by the first UE for transmissions by the second UE, referred to herein as non-preferred sidelink resources. Additionally, or alternatively, the inter-UE coordination signaling may indicate a resource conflict (e.g., a collision), such as when two UEs have reserved the same resource (e.g., and were unable to detect this conflict because the two UEs transmitted a resource reservation message on the same resource and thus did not receive one another's resource reservation messages due to a half duplex constraint).

In some aspects, a non-preferred sidelink resource, from the first UE's 505 perspective, may be in a slot where the first UE 505 is performing a transmission (whether an uplink transmission or a sidelink transmission) and cannot receive due to half duplex constraints. Additionally, or alternatively, a non-preferred sidelink resource may be a resource that overlaps with resources where the first UE 505 is expected to receive downlink or sidelink transmissions. Additionally, or alternatively, a non-preferred sidelink resource may be a resource that is in a period where the first UE 505 is unable to receive due to a power saving configuration, such as a DRX cycle. Non-preferred sidelink resources can also be selected for reasons other than those provided above, and the techniques and apparatuses described herein are not limited to those involving the above reasons.

The second UE 510 may select a sidelink resource for a transmission from the second UE 510 based at least in part on the set of available resources indicated by the first UE 505. As shown by reference number 520, the second UE 510 may account for the coordination information when transmitting. For example, the second UE 510 may perform a transmission via a sidelink resource indicated as available by the inter-UE coordination message. Inter-UE coordination signaling related to resource allocation or selection may reduce collisions between the first UE 505 and the second UE 510 and may reduce a power consumption for the first UE 505 and/or the second UE 510 (e.g., due to fewer retransmissions as a result of fewer collisions). However, inter-UE coordination signaling related to resource allocation or selection may not provide an exception for high priority communications to be transmitted by the second UE 510 to the first UE 505 on a non-preferred resource.

In some aspects, described herein, the second UE 510 may select a non-preferred resource for a communication. Techniques described herein provide conditions for selecting non-preferred resources and signaling associated with selection of non-preferred resources. As shown by reference number 525, a condition for selecting a non-preferred resource for communication may be configured per resource pool, pre-configured per resource pool, configured by the first UE 505, or configured by the second UE 510, as described in more detail elsewhere herein.

Although FIG. 5 shows a single first UE 505 transmitting inter-UE coordination information to a single second UE 510, in some aspects, a single first UE 505 may transmit inter-UE coordination information to multiple UEs to assist those UEs with selecting resources for transmissions. Additionally, or alternatively, the second UE 510 may receive inter-UE coordination information from multiple UEs, and may use that information to select resources for a transmission (e.g., resources that avoid a conflict with all of the multiple UEs or as many as possible).

As indicated above, FIG. 5 is provided as an example. Other examples may differ from what is described with respect to FIG. 5.

Figure 6:
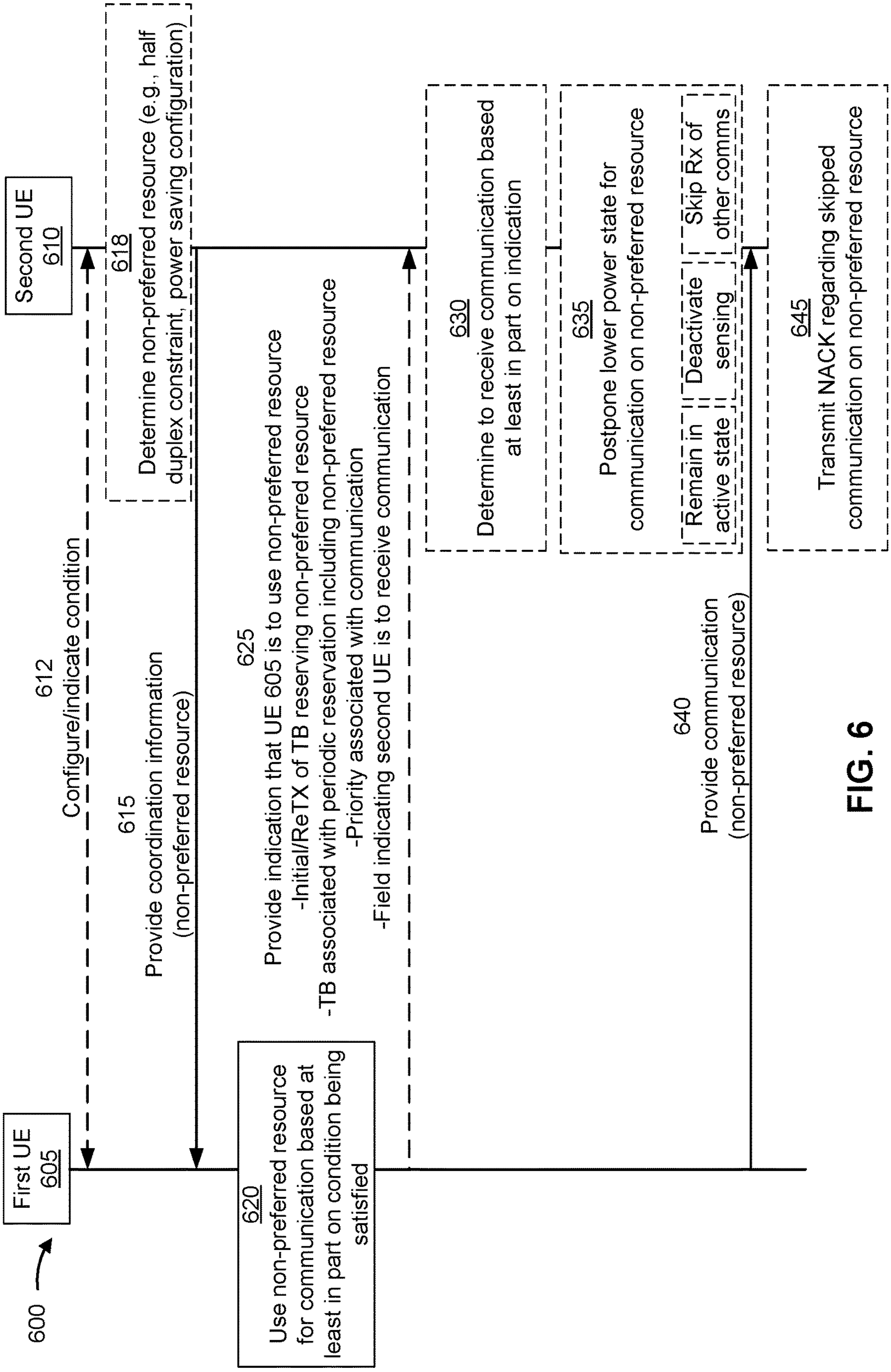
FIG. 6 is a diagram illustrating an example associated with conditional reception availability for sidelink communications, in accordance with the present disclosure.

FIG. 6 is a diagram illustrating an example 600 associated with conditional reception availability for sidelink communications, in accordance with the present disclosure. As shown in FIG. 6, a first UE 605 (e.g., UE 120 of FIG. 1, UE 305-1 of FIG. 3, UE 405 of FIG. 4, UE 510 of FIG. 5) and a second UE 610 (e.g., UE 120 of FIG. 1, UE 305-2 of FIG. 3, UE 410 of FIG. 4, UE 505 of FIG. 5) may communicate with one another via a sidelink channel.

As shown by reference number 615, the second UE 610 may provide coordination information to the first UE 605. The coordination information is information transmitted from the second UE 610 to the first UE 605 that indicates preferred or non-preferred resources for transmission by the first UE 605. For example, as indicated in FIG. 6, the coordination information may indicate a non-preferred resource on which the first UE 605 is requested to avoid transmitting. In some aspects, the coordination information may indicate a conflict associated with one or more sidelink resources. In some aspects, the second UE 610 may determine the non-preferred resource, as shown by reference number 618. For example, the second UE 610 may determine the non-preferred resource based at least in part on a half duplex constraint, a power saving configuration, or the like, as described elsewhere herein.

In some aspects, the first UE 605 may determine a condition associated with transmitting a communication on the non-preferred sidelink resource. For example, the first UE 605 may receive information identifying the condition, such as via the signaling shown by reference number 612. As another example, the first UE 605 may determine the condition without having received such information. In some aspects, the condition may be configured by the first UE 605 and/or the second UE 610, such as via the signaling shown by reference number 612. For example, the condition may be configured over PC5-RRC signaling. In some aspects, the condition may be indicated as part of inter-UE coordination messaging transmitted between the first UE 605 and the second UE 610 (such as at reference number 612).

In some aspects, information identifying the condition may be included in the coordination information. For example, the coordination information may indicate that the first UE 605 may transmit a communication on the non-preferred sidelink resource when a condition associated with the communication is satisfied.

In some aspects, the condition associated with the communication may be satisfied if a priority of the communication satisfies a priority threshold. For example, the condition may be satisfied when a packet priority of a packet associated with the communication is greater than a priority threshold (meaning that the communication is a more urgent, more reliable, or more important communication relative to a communication associated with the non-preferred resource). Alternatively, and/or additionally, the condition may be satisfied when a packet delay budget of the communication is below a threshold. The priority threshold and/or the threshold for the packet delay budget may be defined (e.g., in a specification for wireless communication), configured or pre-configured per resource pool, configured via sidelink RRC signaling, or indicated as part of inter-UE coordination messaging.

In some aspects, the condition is a pre-configured condition. For example, the condition may be pre-configured based at least in part on a condition defined in a specification associated with sidelink communications. In some aspects, the condition is configured (or pre-configured) per resource pool. For example, configuration information associated with a resource pool may identify the condition. As another example, a rule may be pre-configured that indicates how a condition is to be determined for a configured resource pool.

In some aspects, the first UE 605 may determine that a condition associated with a communication is satisfied. For example, the first UE 605 may determine that the condition is satisfied based at least in part on a packet priority of a packet associated with the communication being greater than a priority threshold, a packet delay budget of the communication being below a threshold, or the like. As shown by reference number 620, the first UE 605 may use the non-preferred resource for transmitting the communication to the second UE 610 based at least in part on the condition being satisfied.

In some aspects, as shown by reference number 625, prior to transmitting the communication on the non-preferred resource, the first UE 605 may provide an indication that the first UE 605 is to use the non-preferred resource. The first UE 605 may provide the indication on a preferred sidelink resource of the second UE 610. In some aspects, the indication includes a value of a parameter that satisfies the condition. For example, the indication may include (e.g., indicate) a priority that is associated with the communication and that satisfies the priority threshold. As another example, the indication may include a packet delay budget that is lower than a threshold for a packet delay budget.

In some aspects, the indication may be included in a transmission. The transmission may include an initial transmission (such as an initial transmission of a TB), an SCI reserving a resource that includes the non-preferred sidelink resource for retransmission of a TB, a transmission of a TB associated with a periodic reservation that includes the non-preferred sidelink resource, or the like. In some aspects, the indication may include a field (e.g., a dedicated control field) in the transmission being set to a value. In some aspects, the first UE 605 may transmit the transmission to the second UE 610 via coordination messaging (e.g., UE coordination signaling).

In some aspects, as shown by reference number 630, the second UE 610 may determine to receive the communication on the non-preferred resource based at least in part on the indication. For example, the second UE 610 may determine to receive the communication on the non-preferred resource based at least in part on the presence of the indication (e.g., based at least in part on having received the indication). In some aspects, the second UE 610 may determine to receive the communication on the non-preferred resource based at least in part on a priority associated with the communication and a priority associated with the non-preferred resource.

For example, the indication may include the priority associated with the communication. The second UE 610 may determine that the priority associated with the communication is a higher priority relative to a priority associated with the non-preferred resource. The second UE 610 may determine to receive the communication on the non-preferred resource based at least in part on the priority associated with the communication being a higher priority relative to the priority associated with the non-preferred resource. In some aspects, the priority associated with the communication and the priority associated with the non-preferred resource may use different priority schemes. For example, one of the priority schemes may be a binary scheme (e.g., "high priority" versus "low priority") and the other of the priority schemes may be a more granular priority scheme involving more than two potential priority levels. The second UE 610 may utilize a mapping between the different priority schemes to determine whether the priority associated with the communication is a higher priority relative to the priority associated with the non-preferred resource. For example, if there are eight possible priorities for the communication and two possible priorities for the non-preferred resource, then a lower four of the eight priorities may be mapped to a lower priority for the non-preferred resource and a higher four of the eight priorities may be mapped to a higher priority for the non-preferred resource. In some aspects, the mapping may be based at least in part on a threshold used to compare sidelink and uplink transmission priorities for intra-UE prioritization.

In some aspects, as shown by reference number 635, the second UE 610 may postpone transitioning to a lower power state to receive the communication on the non-preferred resource. For example, the second UE 610 may be configured for DRX. DRX uses a DRX cycle. A DRX cycle is associated with an inactive time (e.g., an off duration) in which a UE is not expected to receive control information and operates in a lower power state. A DRX cycle is also associated with an active time (e.g., an on duration) in which a UE monitors for control information and operates in a higher power state associated with monitoring for control information. If control information is received, the UE remains in the active time to receive a corresponding data transmission, before moving back to a lower power state. In some aspects, the non-preferred resource may be associated with (e.g., occur during) an inactive time (e.g., an off duration) of the DRX cycle. The second UE 610 may remain in an active state (e.g., the second UE 610 may extend an active time of the DRX cycle) for reception of the communication on the non-preferred resource based at least in part on receiving the indication.

In some aspects, the second UE 610 may perform one or more actions to conserve power during the active state for reception of the communication on the non-preferred resource, thus reducing power consumption. For example, the second UE 610 may deactivate sensing during the active state for reception of the communication on the non-preferred resource. As another example, the second UE 610 may not receive communications other than the communication from the second UE 610 on the non-preferred resource during the active state. That is, the second UE 610 may not be required (e.g., expected) to receive communications other than the communication on the non-preferred sidelink resource during the active state. For example, the second UE 610 may skip reception of the communications other than the communication on the non-preferred sidelink resource during the active state (e.g., may not monitor for such communications).

As shown by reference number 640, the first UE 605 may transmit the communication to the second UE 610 on the non-preferred resource. The second UE 610 may receive the communication from the first UE 605 on the non-preferred resource.

In some aspects, as shown by reference number 645, the second UE 610 may transmit a negative acknowledgement (NACK) regarding another communication transmitted to the second UE 610 on the non-preferred resource. For example, the second UE 610 may have indicated that the non-preferred resource was non-preferred because the other communication was to be received on the non-preferred resource. The second UE 610 may not receive the other communication based at least in part on receiving the communication from the first UE 605 on the non-preferred resource. The second UE 610 may transmit a NACK to a device that transmitted the other communication to the second UE 610, such as a base station (if a downlink transmission was skipped) or another UE (if a sidelink transmission was skipped) based at least in part on the second UE 610 not receiving the other communication. In some aspects, the second UE 610 may retransmit a sidelink transmission that was skipped on the non-preferred resource. In some aspects, the second UE 610 may reselect resources for a sidelink transmission that was skipped on the non-preferred resource.

As indicated above, FIG. 6 is provided as an example. Other examples may differ from what is described with respect to FIG. 6.

Figure 7:
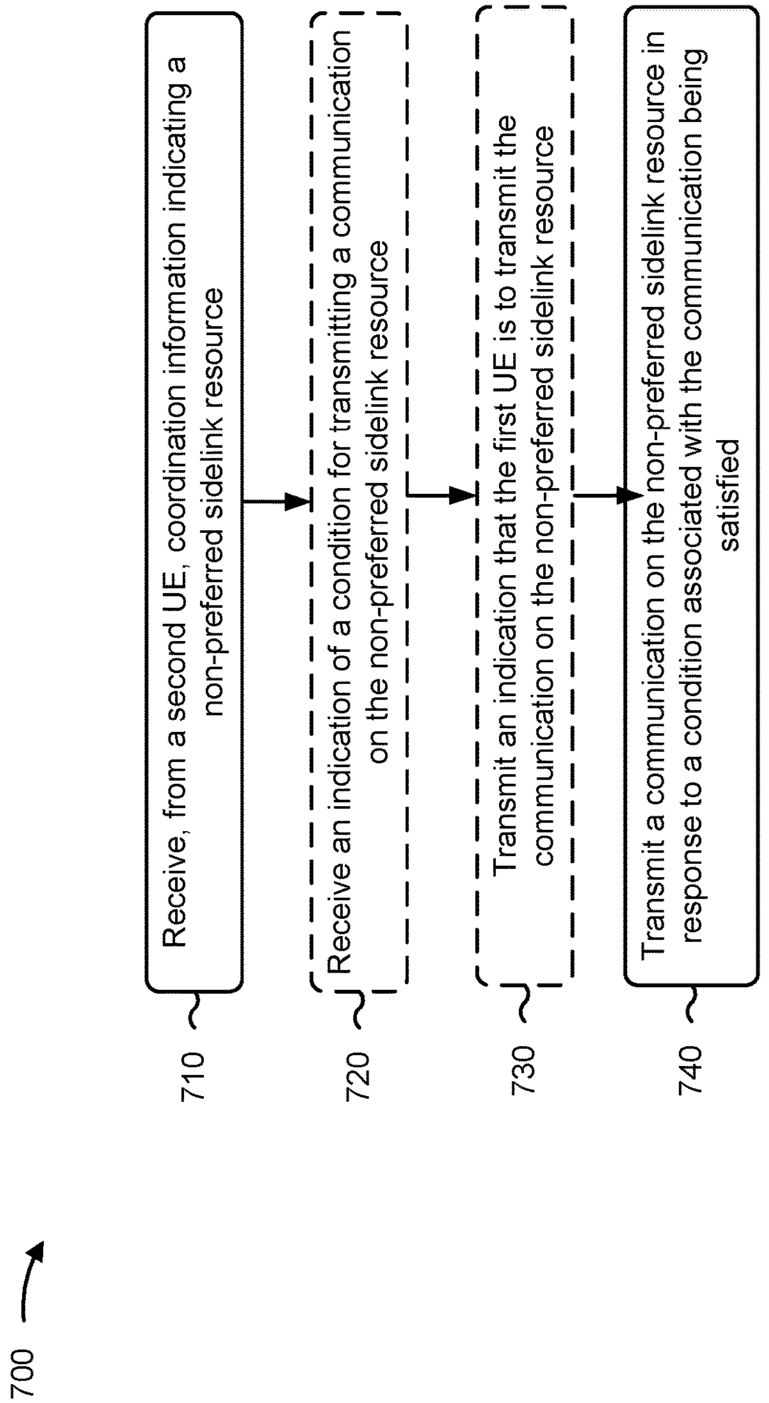
FIG. 7 is a diagram illustrating an example process associated with conditional reception availability for sidelink communications, in accordance with the present disclosure.

FIG. 7 is a diagram illustrating an example process 700 performed, for example, by a first UE, in accordance with the present disclosure. Example process 700 is an example where the first UE (e.g., first UE 120) performs operations associated with conditional reception availability for sidelink communications.

As shown in FIG. 7, in some aspects, process 700 may include receiving, from a second UE, coordination information indicating a non-preferred sidelink resource (block 710). For example, the first UE (e.g., using communication manager 140 and/or reception component 902, depicted in FIG. 9) may receive, from a second UE, coordination information indicating a non-preferred sidelink resource, as described above. In some aspects, the coordination information may indicate to avoid transmitting on the non-preferred sidelink resource.

As further shown in FIG. 7, in some aspects, process 700 may include receiving an indication of a condition for transmitting a communication on the non-preferred sidelink resource (block 720). For example, the first UE (e.g., using communication manager 140 and/or reception component 902, depicted in FIG. 9) may receive an indication of a condition for transmitting a communication on the non-preferred sidelink resource via coordination messaging, as described above.

As further shown in FIG. 7, in some aspects, process 700 may include transmitting an indication that the first UE is to transmit the communication on the non-preferred sidelink resource (block 730). For example, the first UE (e.g., using communication manager 140 and/or transmission component 904, depicted in FIG. 9) may transmit an indication that the first UE is to transmit the communication on the non-preferred sidelink resource, as described above.

As further shown in FIG. 7, in some aspects, process 700 may include transmitting a communication on the non-preferred sidelink resource in response to a condition associated with the communication being satisfied (block 740). For example, the first UE (e.g., using communication manager 140 and/or transmission component 904, depicted in FIG. 9) may transmit a communication on the non-preferred sidelink resource when a condition associated with the communication is satisfied, as described above.

Process 700 may include additional aspects, such as any single aspect or any combination of aspects described below and/or in connection with one or more other processes described elsewhere herein.

In a first aspect, the condition associated with the communication is satisfied if a priority of the communication satisfies a priority threshold.

In a second aspect, alone or in combination with the first aspect, the condition associated with the communication is satisfied if a packet delay budget of the communication is below a threshold.

In a third aspect, alone or in combination with one or more of the first and second aspects, the condition is one of configured per resource pool or pre-configured per resource pool.

In a fourth aspect, alone or in combination with one or more of the first through third aspects, the condition is configured by at least one of the first UE or the second UE.

In a fifth aspect, alone or in combination with one or more of the first through fourth aspects, the indication is one of an initial transmission or a retransmission of a transport block reserving a resource including the non-preferred sidelink resource.

In a sixth aspect, alone or in combination with one or more of the first through fifth aspects, the indication is a transmission of a transport block associated with a periodic reservation that includes the non-preferred sidelink resource.

In a seventh aspect, alone or in combination with one or more of the first through sixth aspects, the indication is transmitted via coordination messaging.

In an eighth aspect, alone or in combination with one or more of the first through seventh aspects, the indication indicates a priority associated with the communication on the non-preferred sidelink resource.

In a ninth aspect, alone or in combination with one or more of the first through eighth aspects, the indication includes a field indicating that the second UE is to receive the communication on the non-preferred sidelink resource.

In a tenth aspect, alone or in combination with one or more of the first through ninth aspects, the non-preferred sidelink resource is based at least in part on a half duplex constraint at the second UE.

In an eleventh aspect, alone or in combination with one or more of the first through tenth aspects, the non-preferred sidelink resource is based at least in part on a power saving configuration at the second UE.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
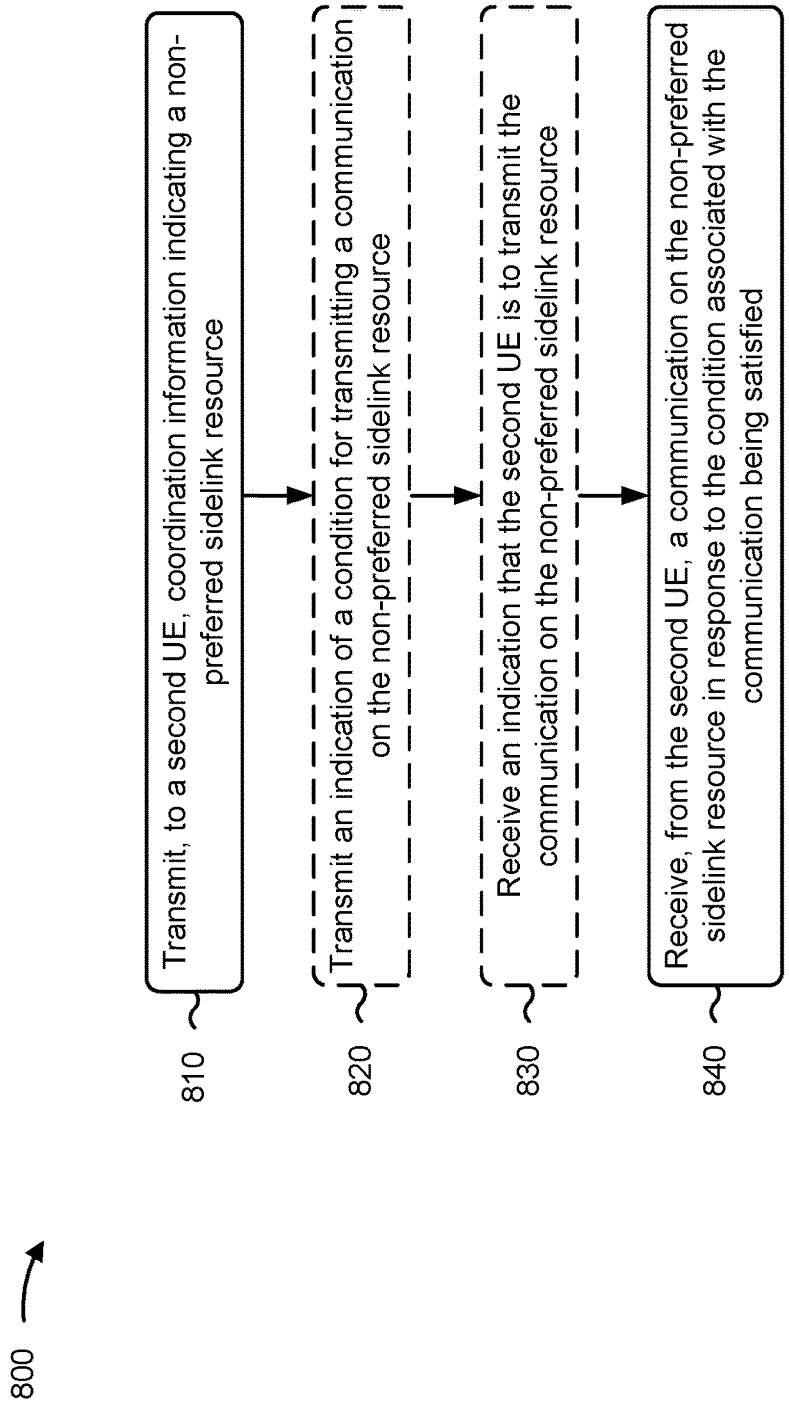
FIG. 8 is a diagram illustrating an example process associated with conditional reception availability for sidelink communications, in accordance with the present disclosure.

FIG. 8 is a diagram illustrating an example process 800 performed, for example, by a first UE, in accordance with the present disclosure. Example process 800 is an example where the first UE (e.g., first UE 120) performs operations associated with conditional reception availability for sidelink communications.

As shown in FIG. 8, in some aspects, process 800 may include transmitting, to a second UE, coordination information indicating a non-preferred sidelink resource (block 810). For example, the first UE (e.g., using communication manager 140 and/or transmission component 1204, depicted in FIG. 12) may transmit, to a second UE, coordination information indicating a non-preferred sidelink resource, as described above.

As further shown in FIG. 8, in some aspects, process 800 may include transmitting an indication of a condition for transmitting a communication on the non-preferred sidelink resource (block 820). For example, the first UE (e.g., using communication manager 140 and/or transmission component 1204, depicted in FIG. 12) may transmit an indication of a condition for transmitting a communication on the non-preferred sidelink resource, as described above.

As further shown in FIG. 8, in some aspects, process 800 may include receiving an indication that the second UE is to transmit the communication on the non-preferred sidelink resource (block 830). For example, the first UE (e.g., using communication manager 140 and/or reception component 1202, depicted in FIG. 12) may receive an indication that the second UE is to transmit the communication on the non-preferred sidelink resource, as described above.

As further shown in FIG. 8, in some aspects, process 800 may include receiving, from the second UE, a communication on the non-preferred sidelink resource in response to a condition associated with the communication being satisfied (block 840). For example, the first UE (e.g., using communication manager 140 and/or reception component 1202, depicted in FIG. 12) may receive, from the second UE, a communication on the non-preferred sidelink resource when a condition associated with the communication is satisfied, as described above.

Process 800 may include additional aspects, such as any single aspect or any combination of aspects described below and/or in connection with one or more other processes described elsewhere herein.

In a first aspect, the condition associated with the communication is satisfied if a priority of the communication satisfies a priority threshold.

In a second aspect, alone or in combination with the first aspect, the condition associated with the communication is satisfied if a packet delay budget of the communication is below a threshold.

In a third aspect, alone or in combination with one or more of the first and second aspects, the condition is configured or pre-configured per resource pool.

In a fourth aspect, alone or in combination with one or more of the first through third aspects, the condition is configured by at least one of the first UE or the second UE.

In a fifth aspect, alone or in combination with one or more of the first through fourth aspects, the indication is one of an initial transmission or a retransmission of a transport block reserving a resource including the non-preferred sidelink resource.

In a sixth aspect, alone or in combination with one or more of the first through fifth aspects, the indication is a transmission of a transport block associated with a periodic reservation that includes the non-preferred sidelink resource.

In a seventh aspect, alone or in combination with one or more of the first through sixth aspects, the indication is received via coordination messaging.

In an eighth aspect, alone or in combination with one or more of the first through seventh aspects, the indication indicates a priority associated with the communication on the non-preferred sidelink resource, and wherein receiving the communication further comprises receiving the communication based at least in part on the priority associated with the communication and a priority associated with the non-preferred sidelink resource.

In a ninth aspect, alone or in combination with one or more of the first through eighth aspects, the indication includes a field indicating that the second UE is to receive the communication on the non-preferred sidelink resource.

In a tenth aspect, alone or in combination with one or more of the first through ninth aspects, process 800 includes receiving the communication based at least in part on the indication.

In an eleventh aspect, alone or in combination with one or more of the first through tenth aspects, process 800 includes transmitting a negative acknowledgment to a transmitter of a skipped communication associated with the non-preferred sidelink resource.

In a twelfth aspect, alone or in combination with one or more of the first through eleventh aspects, process 800 includes remaining in an active state for reception of the communication on the non-preferred sidelink resource.

In a thirteenth aspect, alone or in combination with one or more of the first through twelfth aspects, process 800 includes deactivating sensing during the active state for reception of the communication on the non-preferred sidelink resource.

In a fourteenth aspect, alone or in combination with one or more of the first through thirteenth aspects, process 800 further comprises skipping reception of one or more communications other than the communication on the non-preferred sidelink resource during the active state.

In a fifteenth aspect, alone or in combination with one or more of the first through fourteenth aspects, the process 800 includes determining the non-preferred sidelink resource based at least in part on a half duplex constraint at the first UE or a power saving configuration at the first UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
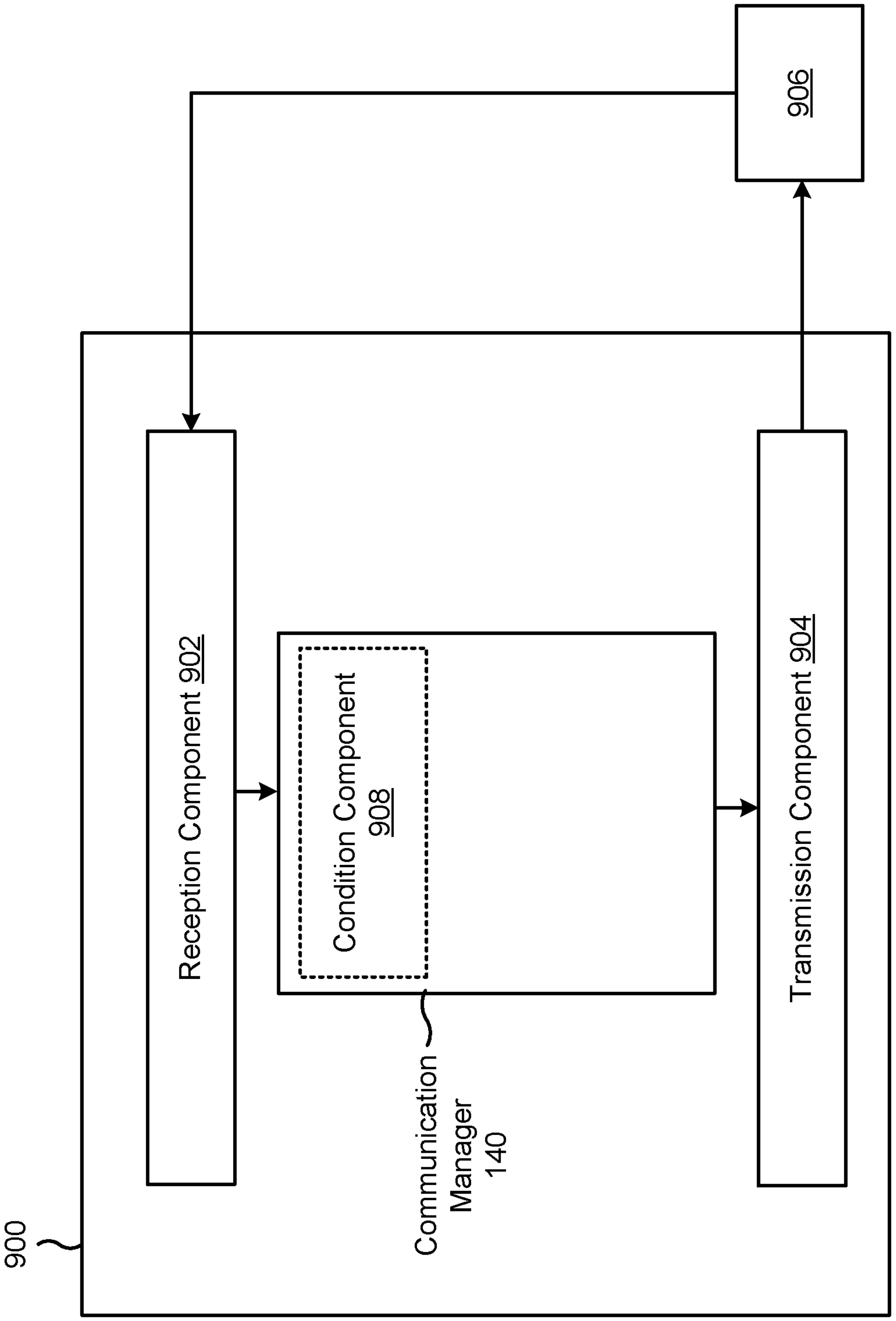
FIG. 9 is a block diagram of an example apparatus for wireless communication, in accordance with the present disclosure.

FIG. 9 is a block diagram of an example apparatus 900 for wireless communication. The apparatus 900 may be a first UE, or a first UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include a condition component 908, among other examples.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7, process 800 of FIG. 8, or a combination thereof. In some aspects, the apparatus 900 and/or one or more components shown in FIG. 9 may include one or more components of the first UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the first UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the first UE described above in connection with FIG. 2. In some aspects, the transmission component 904 may be co-located with the reception component 902 in a transceiver.

The reception component 902 may receive, from a second UE, coordination information indicating a non-preferred sidelink resource. The transmission component 904 may transmit a communication on the non-preferred sidelink resource when a condition associated with the communication is satisfied.

The reception component 902 may receive an indication of the condition via coordination messaging.

The condition component 908 may determine that the condition is satisfied.

The transmission component 904 may transmit, to the second UE, an indication that the first UE is to transmit the communication on the non-preferred sidelink resource.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
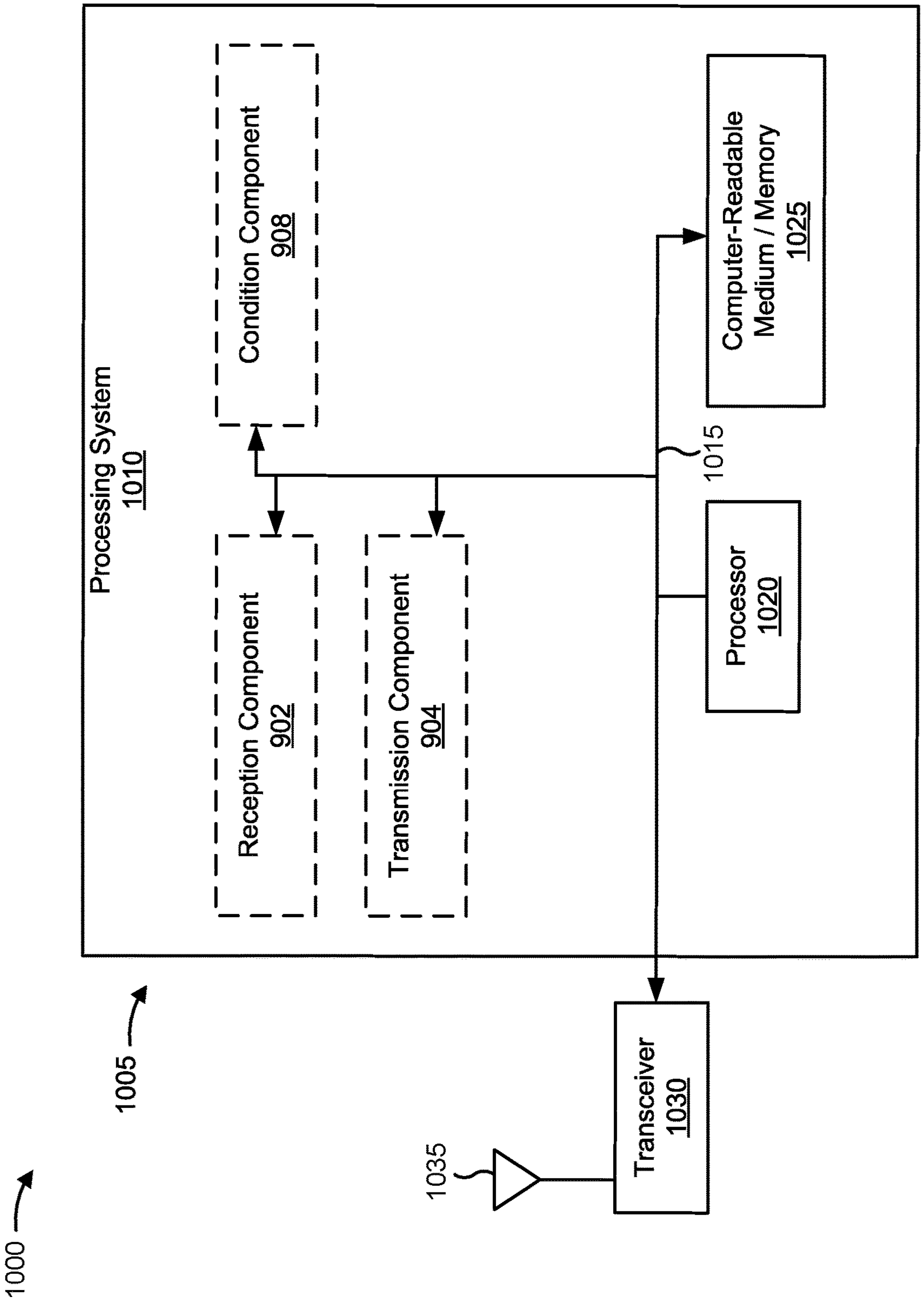
FIG. 10 is a diagram illustrating an example of a hardware implementation for an apparatus employing a processing system, in accordance with the present disclosure.

FIG. 10 is a diagram illustrating an example 1000 of a hardware implementation for an apparatus 1005 employing a processing system 1010. The apparatus 1005 may be a first UE.

The processing system 1010 may be implemented with a bus architecture, represented generally by the bus 1015. The bus 1015 may include any number of interconnecting buses and bridges depending on the specific application of the processing system 1010 and the overall design constraints. The bus 1015 links together various circuits including one or more processors and/or hardware components, represented by the processor 1020, the illustrated components, and the computer-readable medium/memory 1025. The bus 1015 may also link various other circuits, such as timing sources, peripherals, voltage regulators, and/or power management circuits.

The processing system 1010 may be coupled to a transceiver 1030. The transceiver 1030 is coupled to one or more antennas 1035. The transceiver 1030 provides a means for communicating with various other apparatuses over a transmission medium. The transceiver 1030 receives a signal from the one or more antennas 1035, extracts information from the received signal, and provides the extracted information to the processing system 1010, specifically the reception component 902. In addition, the transceiver 1030 receives information from the processing system 1010, specifically the transmission component 904, and generates a signal to be applied to the one or more antennas 1035 based at least in part on the received information.

The processing system 1010 includes a processor 1020 coupled to a computer-readable medium/memory 1025. The processor 1020 is responsible for general processing, including the execution of software stored on the computer-readable medium/memory 1025. The software, when executed by the processor 1020, causes the processing system 1010 to perform the various functions described herein for any particular apparatus. The computer-readable medium/memory 1025 may also be used for storing data that is manipulated by the processor 1020 when executing software. The processing system further includes at least one of the illustrated components. The components may be software modules running in the processor 1020, resident/stored in the computer readable medium/memory 1025, one or more hardware modules coupled to the processor 1020, or some combination thereof.

In some aspects, the processing system 1010 may be a component of the UE 120 and may include the memory 282 and/or at least one of the TX MIMO processor 266, the RX processor 258, and/or the controller/processor 280. In some aspects, the apparatus 1005 for wireless communication includes means for receiving, from a second UE, coordination information indicating a non-preferred sidelink resource; and means for transmitting a communication on the non-preferred sidelink resource when a condition associated with the communication is satisfied. The aforementioned means may be one or more of the aforementioned components of the apparatus 900 and/or the processing system 1010 of the apparatus 1005 configured to perform the functions recited by the aforementioned means. As described elsewhere herein, the processing system 1010 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 10 is provided as an example. Other examples may differ from what is described in connection with FIG. 10.

Figure 11:
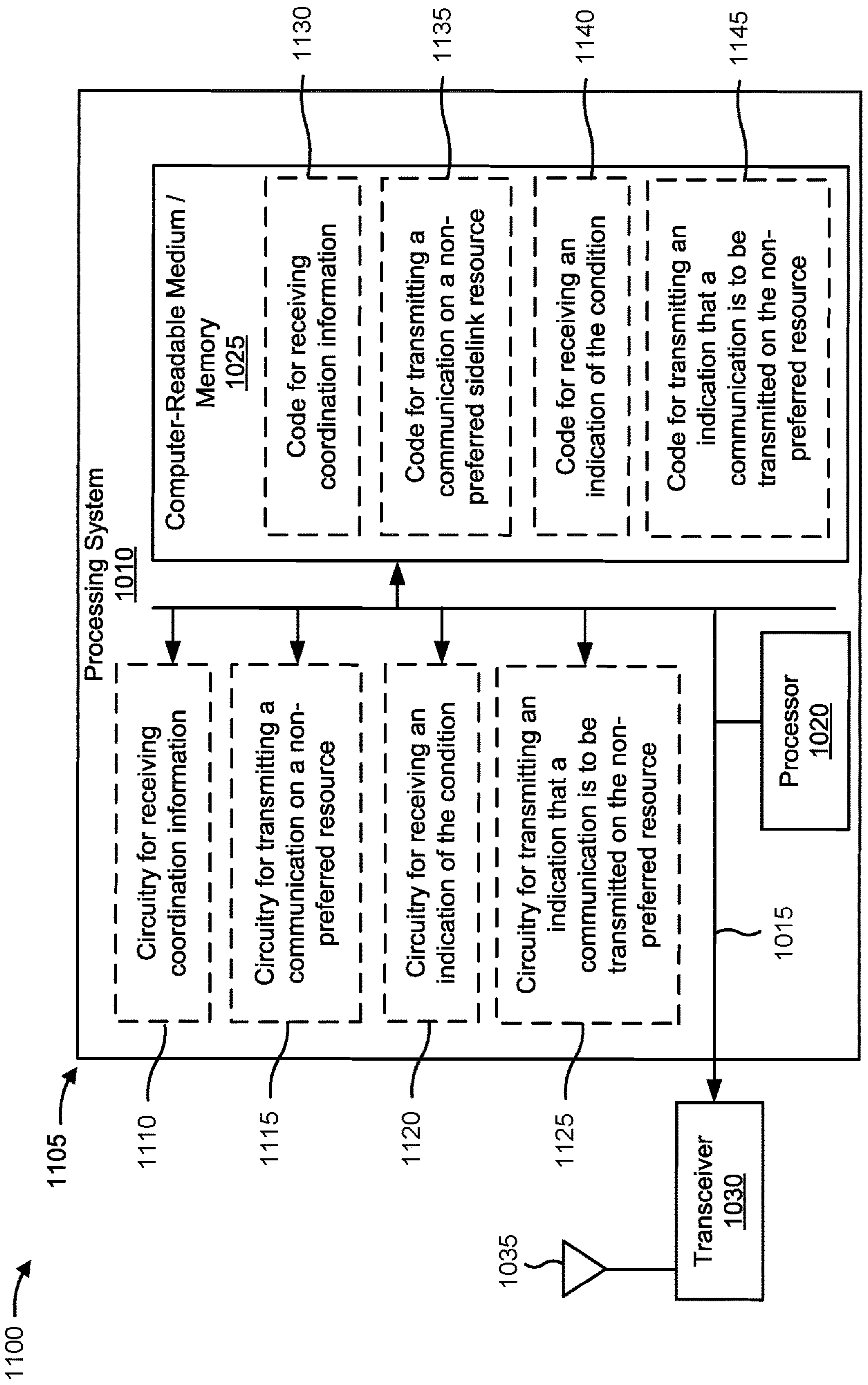
FIG. 11 is a diagram illustrating an example implementation of code and circuitry for an apparatus, in accordance with the present disclosure.

FIG. 11 is a diagram illustrating an example 1100 of an implementation of code and circuitry for an apparatus 1105. The apparatus 1105 may be a UE, such as UE 120 of FIG. 1, UE 305-1 of FIG. 3, UE 405 of FIG. 4, UE 510 of FIG. 5, or UE 605 of FIG. 6, among other examples.

As further shown in FIG. 11, the apparatus 1105 may include circuitry for receiving coordination information (circuitry 1110). For example, the apparatus 1105 may include circuitry to enable the apparatus 1105 to receive coordination information indicating a non-preferred sidelink resource.

As further shown in FIG. 11, the apparatus 1105 may include circuitry for transmitting a communication on a non-preferred sidelink resource when a condition is satisfied (circuitry 1115). For example, the apparatus 1105 may include circuitry to enable the apparatus 1105 to transmit a communication on a non-preferred sidelink resource when a condition associated with the communication is satisfied.

As further shown in FIG. 11, the apparatus 1105 may include circuitry for receiving an indication of the condition (circuitry 1120). For example, the apparatus 1105 may include circuitry to enable the apparatus 1105 to receive an indication of the condition via coordination messaging.

As further shown in FIG. 11, the apparatus 1105 may include circuitry for transmitting an indication that a communication is to be transmitted on the non-preferred resource (circuitry 1125). For example, the apparatus 1105 may include circuitry to enable the apparatus 1105 to transmit, to a second UE (such as UE 120 of FIG. 1, UE 305-2 of FIG. 3, UE 410 of FIG. 4, UE 505 of FIG. 5, or UE 610 of FIG. 6, among other examples), an indication that the UE is to transmit the communication on the non-preferred sidelink resource.

As further shown in FIG. 11, the apparatus 1105 may include, stored in computer-readable medium 1025, code for receiving coordination information (code 1130). For example, the apparatus 1105 may include code that, when executed by the processor 1020, may cause the transceiver 1030 to receive coordination information indicating a non-preferred sidelink resource.

As further shown in FIG. 11, the apparatus 1105 may include, stored in computer-readable medium 1025, code for transmitting a communication on a non-preferred sidelink resource when a condition is satisfied (code 1135). For example, the apparatus 1105 may include code that, when executed by the processor 1020, may cause the transceiver 1030 to transmit a communication on a non-preferred sidelink resource when a condition associated with the communication is satisfied.

As further shown in FIG. 11, the apparatus 1105 may include, stored in computer-readable medium 1025, code for receiving an indication of the condition (code 1140). For example, the apparatus 1105 may include code that, when executed by the processor 1020, may cause the transceiver 1030 to receive an indication of the condition via coordination messaging.

As further shown in FIG. 11, the apparatus 1105 may include, stored in computer-readable medium 1025, code for transmitting an indication that a communication is to be transmitted on the non-preferred resource (code 1145). For example, the apparatus 1105 may include code that, when executed by the processor 1020, may cause the transceiver 1030 to transmit, to a second UE (such as UE 120 of FIG. 1, UE 305-2 of FIG. 3, UE 410 of FIG. 4, UE 505 of FIG. 5, or UE 610 of FIG. 6, among other examples), an indication that the UE is to transmit the communication on the non-preferred sidelink resource.

FIG. 11 is provided as an example. Other examples may differ from what is described in connection with FIG. 11.

Figure 12:
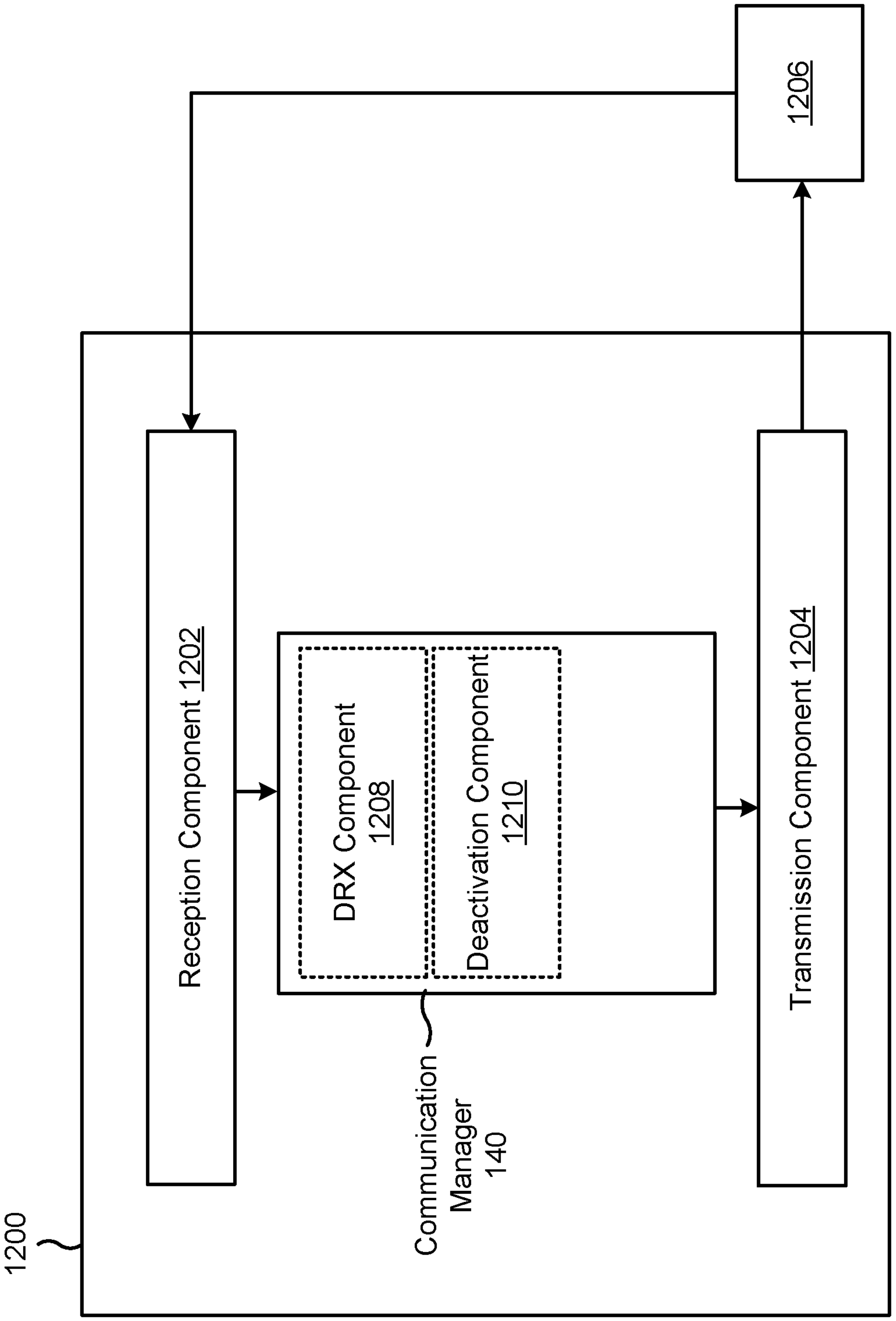
FIG. 12 is a block diagram of an example apparatus for wireless communication, in accordance with the present disclosure.

FIG. 12 is a block diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include one or more of a DRX component 1208 or a deactivation component 1210, among other examples.

In some aspects, the apparatus 1200 may be configured to perform one or more operations described herein in connection with FIG. 6. Additionally, or alternatively, the apparatus 1200 may be configured to perform one or more processes described herein, such as process 700 of FIG. 7, process 800 of FIG. 8, or a combination thereof. In some aspects, the apparatus 1200 and/or one or more components shown in FIG. 12 may include one or more components of the first UE described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the first UE described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the first UE described above in connection with FIG. 2. In some aspects, the transmission component 1204 may be co-located with the reception component 1202 in a transceiver.

The transmission component 1204 may transmit, to a second UE, coordination information indicating a non-preferred sidelink resource. The reception component 1202 may receive, from the second UE a communication on the non-preferred sidelink resource when a condition associated with the communication is satisfied.

The transmission component 1204 may transmit an indication of the condition via coordination messaging.

The reception component 1202 may receive, from the second UE, an indication that the second UE is to transmit the communication on the non-preferred sidelink resource.

The reception component 1202 may receive the communication based at least in part on the indication.

The transmission component 1204 may transmit a negative acknowledgment to a transmitter of a skipped communication associated with the non-preferred sidelink resource.

The DRX component 1208 may remain in an active state for reception of the communication on the non-preferred sidelink resource.

The deactivation component 1210 may deactivate sensing during the active state for reception of the communication on the non-preferred sidelink resource.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
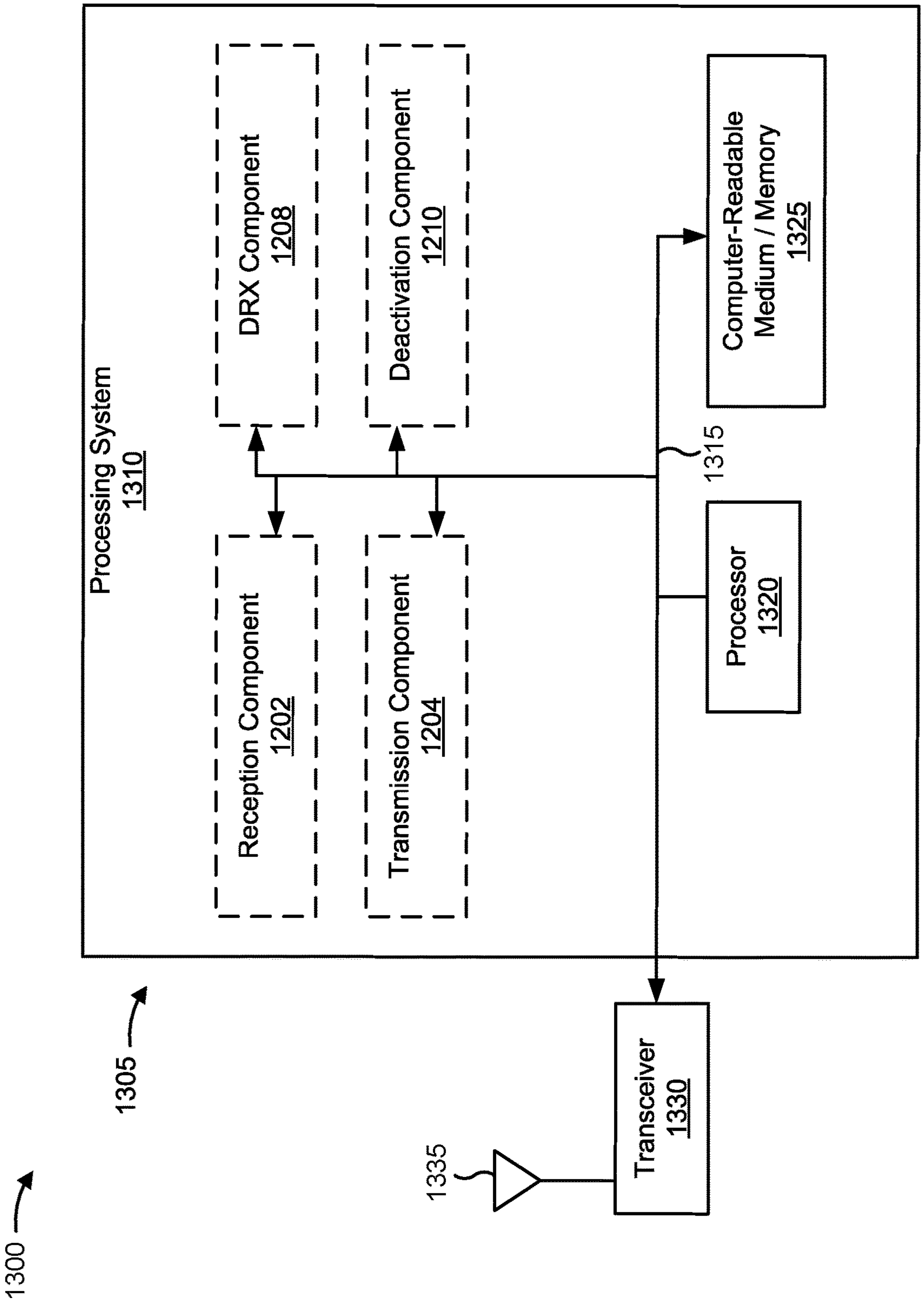
FIG. 13 is a diagram illustrating an example of a hardware implementation for an apparatus employing a processing system, in accordance with the present disclosure.

FIG. 13 is a diagram illustrating an example 1300 of a hardware implementation for an apparatus 1305 employing a processing system 1310. The apparatus 1305 may be a first UE.

The processing system 1310 may be implemented with a bus architecture, represented generally by the bus 1315. The bus 1315 may include any number of interconnecting buses and bridges depending on the specific application of the processing system 1310 and the overall design constraints. The bus 1315 links together various circuits including one or more processors and/or hardware components, represented by the processor 1320, the illustrated components, and the computer-readable medium/memory 1325. The bus 1315 may also link various other circuits, such as timing sources, peripherals, voltage regulators, and/or power management circuits.

The processing system 1310 may be coupled to a transceiver 1330. The transceiver 1330 is coupled to one or more antennas 1335. The transceiver 1330 provides a means for communicating with various other apparatuses over a transmission medium. The transceiver 1330 receives a signal from the one or more antennas 1335, extracts information from the received signal, and provides the extracted information to the processing system 1310, specifically the reception component 1202. In addition, the transceiver 1330 receives information from the processing system 1310, specifically the transmission component 1204, and generates a signal to be applied to the one or more antennas 1335 based at least in part on the received information.

The processing system 1310 includes a processor 1320 coupled to a computer-readable medium/memory 1325. The processor 1320 is responsible for general processing, including the execution of software stored on the computer-readable medium/memory 1325. The software, when executed by the processor 1320, causes the processing system 1310 to perform the various functions described herein for any particular apparatus. The computer-readable medium/memory 1325 may also be used for storing data that is manipulated by the processor 1320 when executing software. The processing system further includes at least one of the illustrated components. The components may be software modules running in the processor 1320, resident/stored in the computer readable medium/memory 1325, one or more hardware modules coupled to the processor 1320, or some combination thereof.

In some aspects, the processing system 1310 may be a component of the UE 120 and may include the memory 282 and/or at least one of the TX MIMO processor 266, the RX processor 258, and/or the controller/processor 280. In some aspects, the apparatus 1305 for wireless communication includes means for transmitting, to a second UE, coordination information indicating a non-preferred sidelink resource; and means for receiving, from the second UE a communication on the non-preferred sidelink resource when a condition associated with the communication is satisfied. The aforementioned means may be one or more of the aforementioned components of the apparatus 1200 and/or the processing system 1310 of the apparatus 1305 configured to perform the functions recited by the aforementioned means. As described elsewhere herein, the processing system 1310 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 13 is provided as an example. Other examples may differ from what is described in connection with FIG. 13.

Figure 14:
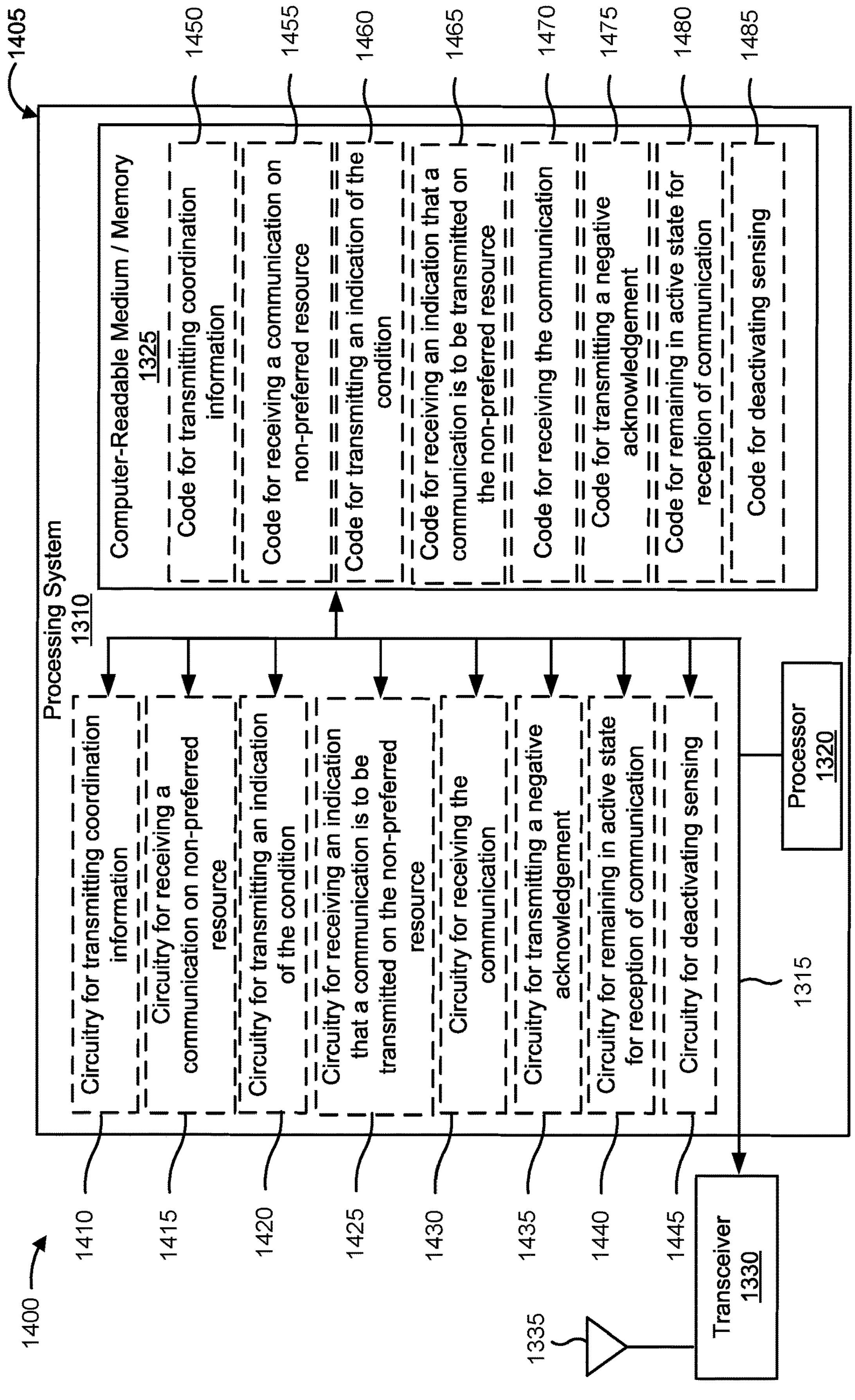
FIG. 14 is a diagram illustrating an example implementation of code and circuitry for an apparatus, in accordance with the present disclosure.

FIG. 14 is a diagram illustrating an example 1400 of an implementation of code and circuitry for an apparatus 1405. The apparatus 1405 may be a UE, such as UE 120 of FIG. 1, UE 305-2 of FIG. 3, UE 410 of FIG. 4, UE 505 of FIG. 5, or UE 610 of FIG. 6, among other examples.

As further shown in FIG. 14, the apparatus 1405 may include circuitry for transmitting coordination information (circuitry 1410). For example, the apparatus 1405 may include circuitry to enable the apparatus 1405 to transmit coordination information indicating a non-preferred sidelink resource.

As further shown in FIG. 14, the apparatus 1405 may include circuitry for receiving a communication on a non-preferred resource when a condition is satisfied (circuitry 1415). For example, the apparatus 1405 may include circuitry to enable the apparatus 1405 to receive, from the second UE a communication on the non-preferred sidelink resource when a condition associated with the communication is satisfied.

As further shown in FIG. 14, the apparatus 1405 may include circuitry for transmitting an indication of the condition (circuitry 1420). For example, the apparatus 1405 may include circuitry to enable the apparatus 1405 to transmit an indication an indication of the condition via coordination messaging.

As further shown in FIG. 14, the apparatus 1405 may include circuitry for receiving an indication that a communication is to be transmitted on the non-preferred resource (circuitry 1425). For example, the apparatus 1405 may include circuitry to enable the apparatus 1405 to receive an indication that the second UE is to transmit the communication on the non-preferred sidelink resource from the second UE.

As further shown in FIG. 14, the apparatus 1405 may include circuitry for receiving the communication (circuitry 1430). For example, the apparatus 1405 may include circuitry to enable the apparatus 1405 to receive the communication based at least in part on the priority associated with the communication and a priority associated with the non-preferred sidelink resource.

As further shown in FIG. 14, the apparatus 1405 may include circuitry for transmitting a negative acknowledgement (circuitry 1435). For example, the apparatus 1405 may include circuitry to enable the apparatus 1405 to transmit a negative acknowledgment to a transmitter of a skipped communication associated with the non-preferred sidelink resource.

As further shown in FIG. 14, the apparatus 1405 may include circuitry for remaining in an active state for reception of the communication (circuitry 1440). For example, the apparatus 1405 may include circuitry to enable the apparatus 1405 to remain in an active state for reception of the communication on the non-preferred sidelink resource.

As further shown in FIG. 14, the apparatus 1405 may include circuitry for deactivating sensing (circuitry 1445). For example, the apparatus 1405 may include circuitry to enable the apparatus 1405 to deactivate sensing during the active state for reception of the communication on the non-preferred sidelink resource.

As further shown in FIG. 14, the apparatus 1405 may include, stored in computer-readable medium 1325, code for transmitting coordination information (code 1450). For example, the apparatus 1405 may include code that, when executed by the processor 1320, may cause the transceiver 1330 to transmit coordination information indicating a non-preferred sidelink resource.

As further shown in FIG. 14, the apparatus 1405 may include, stored in computer-readable medium 1325, code for receiving a communication on a non-preferred resource when a condition is satisfied (code 1455). For example, the apparatus 1405 may include code that, when executed by the processor 1320, may cause the transceiver 1330 to receive, from the second UE a communication on the non-preferred sidelink resource when a condition associated with the communication is satisfied.

As further shown in FIG. 14, the apparatus 1405 may include, stored in computer-readable medium 1325, code for transmitting an indication of the condition (code 1460). For example, the apparatus 1405 may include code that, when executed by the processor 1320, may cause the transceiver 1330 to transmit an indication an indication of the condition via coordination messaging.

As further shown in FIG. 14, the apparatus 1405 may include, stored in computer-readable medium 1325, code for receiving an indication that a communication is to be transmitted on the non-preferred resource (code 1465). For example, the apparatus 1405 may include code that, when executed by the processor 1320, may cause the transceiver 1330 to receive an indication that the second UE is to transmit the communication on the non-preferred sidelink resource from the second UE.

As further shown in FIG. 14, the apparatus 1405 may include, stored in computer-readable medium 1325, code for receiving the communication (code 1470). For example, the apparatus 1405 may include code that, when executed by the processor 1320, may cause the transceiver 1330 to receive the communication based at least in part on the priority associated with the communication and a priority associated with the non-preferred sidelink resource.

As further shown in FIG. 14, the apparatus 1405 may include, stored in computer-readable medium 1325, code for transmitting a negative acknowledgement (code 1475). For example, the apparatus 1405 may include code that, when executed by the processor 1320, may cause the transceiver 1330 to transmit a negative acknowledgment to a transmitter of a skipped communication associated with the non-preferred sidelink resource.

As further shown in FIG. 14, the apparatus 1405 may include, stored in computer-readable medium 1325, code for remaining in an active state for reception of the communication (code 1480). For example, the apparatus 1405 may include code that, when executed by the processor 1320, may cause the transceiver 1330 to remain in an active state for reception of the communication on the non-preferred sidelink resource.

As further shown in FIG. 14, the apparatus 1405 may include, stored in computer-readable medium 1325, code for deactivating sensing (code 1485). For example, the apparatus 1405 may include code that, when executed by the processor 1320, may cause the transceiver 1330 to deactivate sensing during the active state for reception of the communication on the non-preferred sidelink resource.

In some aspects, the apparatus 1405 may include circuitry for determining the non-preferred sidelink resource. For example, the apparatus 1405 may include circuitry to enable the apparatus 1405 to determine the non-preferred sidelink resource based at least in part on a half duplex constraint or a power saving configuration.

In some aspects, the apparatus may include, stored in computer-readable medium 1325, code for determining the non-preferred sidelink resource. For example, the apparatus 1405 may include code that, when executed by the processor 1320, may cause the transceiver 1330 to determine the non-preferred sidelink resource based at least in part on a half duplex constraint or a power saving configuration.

FIG. 14 is provided as an example. Other examples may differ from what is described in connection with FIG. 14.

The following provides an overview of some Aspects of the present disclosure:

Aspect 1: A method of wireless communication performed by a first user equipment (UE), comprising: receiving, from a second UE, coordination information indicating a non-preferred sidelink resource; and transmitting a communication on the non-preferred sidelink resource in response to a condition associated with the communication being satisfied.

Aspect 2: The method of Aspect 1, wherein the condition associated with the communication is satisfied if a priority of the communication satisfies a priority threshold.

Aspect 3: The method of one or more of Aspects 1 and 2, wherein the condition associated with the communication is satisfied if a packet delay budget of the communication is below a threshold.

Aspect 4: The method of one or more of Aspects 1 through 3, wherein the condition is one of configured per resource pool or pre-configured per resource pool.

Aspect 5: The method of one or more of Aspects 1 through 4, wherein the condition is configured by at least one of the first UE or the second UE.

Aspect 6: The method of one or more of Aspects 1 through 5, further comprising: receiving an indication of the condition via coordination messaging.

Aspect 7: The method of one or more of Aspects 1 through 6, further comprising: transmitting, to the second UE, an indication that the first UE is to transmit the communication on the non-preferred sidelink resource.

Aspect 8: The method of Aspect 7, wherein the indication is an initial transmission or a retransmission of a transport block reserving a resource including the non-preferred sidelink resource.

Aspect 9: The method of Aspect 7, wherein the indication is a transmission of a transport block associated with a periodic reservation that includes the non-preferred sidelink resource.

Aspect 10: The method of Aspect 7, wherein the indication is transmitted via coordination messaging.

Aspect 11: The method of Aspect 7, wherein the indication indicates a priority associated with the communication on the non-preferred sidelink resource.

Aspect 12: The method of Aspect 7, wherein the indication includes a field indicating that the second UE is to receive the communication on the non-preferred sidelink resource.

Aspect 13: A method of wireless communication performed by a first UE, comprising: transmitting, to a second UE, coordination information indicating a non-preferred sidelink resource; and receiving, from the second UE a communication on the non-preferred sidelink resource in response to a condition associated with the communication being satisfied.

Aspect 14: The method of Aspect 13, wherein the condition associated with the communication is satisfied if a priority of the communication satisfies a priority threshold.

Aspect 15: The method of one or more of Aspects 13 and 14, wherein the condition associated with the communication is satisfied if a packet delay budget of the communication is below a threshold.

Aspect 16: The method of one or more of Aspects 13 through 15, wherein the condition is configured or pre-configured per resource pool.

Aspect 17: The method of one or more of Aspects 13 through 16, wherein the condition is configured by at least one of the first UE or the second UE.

Aspect 18: The method of one or more of Aspects 13 through 17, further comprising: transmitting an indication of the condition via coordination messaging.

Aspect 19: The method of one or more of Aspects 13 through 18, further comprising: receiving, from the second UE, an indication that the second UE is to transmit the communication on the non-preferred sidelink resource.

Aspect 20: The method of Aspect 19, wherein the indication is an initial transmission or a retransmission of a transport block reserving a resource including the non-preferred sidelink resource.

Aspect 21: The method of Aspect 19, wherein the indication is a transmission of a transport block associated with a periodic reservation that includes the non-preferred sidelink resource.

Aspect 22: The method of Aspect 19, wherein the indication is received via coordination messaging.

Aspect 23: The method of Aspect 19, wherein the indication indicates a priority associated with the communication on the non-preferred sidelink resource, and wherein receiving the communication further comprises: receiving the communication based at least in part on the priority associated with the communication and a priority associated with the non-preferred sidelink resource.

Aspect 24: The method of Aspect 19, wherein the indication includes a field indicating that the second UE is to receive the communication on the non-preferred sidelink resource.

Aspect 25: The method of Aspect 19, further comprising: receiving the communication based at least in part on the indication.

Aspect 26: The method of one or more of Aspects 13 through 25, further comprising: transmitting a negative acknowledgment to a transmitter of a skipped communication associated with the non-preferred sidelink resource.

Aspect 27: The method of one or more of Aspects 13 through 26, further comprising: remaining in an active state for reception of the communication on the non-preferred sidelink resource.

Aspect 28: The method of Aspect 27, further comprising: deactivating sensing during the active state for reception of the communication on the non-preferred sidelink resource.

Aspect 29: The method of Aspect 27, further comprising: skipping reception of one or more communications other than the communication on the non-preferred sidelink resource during the active state.

Aspect 30: The method of one or more of Aspects 1-12, wherein the non-preferred sidelink resource is based at least in part on a half duplex constraint at the second UE.

Aspect 31: The method of one or more of Aspects 1-12 or 30, wherein the non-preferred sidelink resource is based at least in part on a power saving configuration at the second UE.

Aspect 32: The method of one or more of Aspects 13-27, further comprising determining the non-preferred sidelink resource based at least in part on a half duplex constraint at the first UE or a power saving configuration at the second UE.

Aspect 33: An apparatus for wireless communication at a device, comprising a processor; memory coupled with the processor; and instructions stored in the memory and executable by the processor to cause the apparatus to perform the method of one or more of Aspects 1 through 12, 30, or 31.

Aspect 34: A device for wireless communication, comprising a memory and one or more processors coupled to the memory, the one or more processors configured to perform the method of one or more of Aspects 1 through 12, 30, or 31.

Aspect 35: An apparatus for wireless communication, comprising at least one means for performing the method of one or more of Aspects 1 through 12, 30, or 31.

Aspect 36: A non-transitory computer-readable medium storing code for wireless communication, the code comprising instructions executable by a processor to perform the method of one or more of Aspects 1 through 12, 30, or 31.

Aspect 37: A non-transitory computer-readable medium storing a set of instructions for wireless communication, the set of instructions comprising one or more instructions that, when executed by one or more processors of a device, cause the device to perform the method of one or more of Aspects 1 through 12, 30, or 31.

Aspect 38: An apparatus for wireless communication at a device, comprising a processor; memory coupled with the processor; and instructions stored in the memory and executable by the processor to cause the apparatus to perform the method of one or more of Aspects 13 through 29 or 32.

Aspect 39: A device for wireless communication, comprising a memory and one or more processors coupled to the memory, the one or more processors configured to perform the method of one or more of Aspects 13 through 29 or 32.

Aspect 40: An apparatus for wireless communication, comprising at least one means for performing the method of one or more of Aspects 13 through 29 or 32.

Aspect 41: A non-transitory computer-readable medium storing code for wireless communication, the code comprising instructions executable by a processor to perform the method of one or more of Aspects 13 through 29 or 32.

Aspect 42: A non-transitory computer-readable medium storing a set of instructions for wireless communication, the set of instructions comprising one or more instructions that, when executed by one or more processors of a device, cause the device to perform the method of one or more of Aspects 13 through 29 or 32.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first user equipment (UE), comprising:
- one or more memories; and
- one or more processors, coupled to the one or more memories, configured to cause the first UE to:
  - receive, from a second UE, coordination information that indicates a non-preferred sidelink resource in a sidelink resource pool of a plurality of sidelink resource pools; and
  - transmit a communication on the non-preferred sidelink resource based at least in part on satisfaction of a condition for the communication,
    - wherein the condition is a priority threshold for transmission of the communication on the non-preferred sidelink resource, and
    - wherein the priority threshold is configured per sidelink resource pool of the plurality of sidelink resource pools.

2. The apparatus of claim 1, wherein the one or more processors are further configured to cause the first UE to:
- transmit, to the second UE, an indication that the first UE is to transmit the communication on the non-preferred sidelink resource.

3. The apparatus of claim 2, wherein the indication is one of an initial transmission or a retransmission of a transport block associated with reservation of a resource that includes the non-preferred sidelink resource.

4. The apparatus of claim 2, wherein the indication is a transmission of a transport block associated with a periodic reservation that includes the non-preferred sidelink resource.

5. The apparatus of claim 2, wherein the indication is transmitted via coordination messaging.

6. The apparatus of claim 2, wherein the indication indicates a priority associated with the communication on the non-preferred sidelink resource.

7. The apparatus of claim 2, wherein the indication includes a field that indicates the second UE is to receive the communication on the non-preferred sidelink resource.

8. The apparatus of claim 1, wherein the priority threshold is associated with a priority of a packet of the communication.

9. The apparatus of claim 1, wherein the satisfaction of the condition for the communication is based at least in part on whether a packet delay budget of the communication is below a threshold.

10. The apparatus of claim 1, wherein the non-preferred sidelink resource is based at least in part on a half duplex constraint at the second UE.

11. The apparatus of claim 1, wherein the non-preferred sidelink resource is based at least in part on a power saving configuration at the second UE.

12. The apparatus of claim 1, wherein the non-preferred sidelink resource is based at least in part on the priority threshold.

13. An apparatus for wireless communication at a first user equipment (UE), comprising:
- one or more memories; and
- one or more processors, coupled to the one or more memories, configured to cause the first UE to:
  - transmit, to a second UE, coordination information that indicates a non-preferred sidelink resource in a sidelink resource pool of a plurality of sidelink resource pools; and
  - receive, from the second UE, a communication on the non-preferred sidelink resource based at least in part on satisfaction of a condition for the communication,
    - wherein the condition is a priority threshold for transmission of the communication on the non-preferred sidelink resource, and
    - wherein the priority threshold is configured per sidelink resource pool of the plurality of sidelink resource pools.

14. The apparatus of claim 13, wherein the one or more processors are further configured to cause the first UE to:

receive, from the second UE, an indication that the second UE is to transmit the communication on the non-preferred sidelink resource.

15. The apparatus of claim 14, wherein the indication indicates a priority associated with a packet of the communication, and wherein the one or more processors, to receive the communication, are configured to cause the first UE to:

receive the communication based at least in part on the priority associated with the packet of the communication and a priority associated with the non-preferred sidelink resource.

16. The apparatus of claim 14, wherein the indication includes a field that indicates the second UE is to receive the communication on the non-preferred sidelink resource.

17. The apparatus of claim 14, wherein the one or more processors are further configured to cause the first UE to:

receive the communication based at least in part on the indication.

18. The apparatus of claim 13, wherein the one or more processors are further configured to cause the first UE to:

transmit a negative acknowledgment to a transmitter of a skipped communication associated with the non-preferred sidelink resource.

19. The apparatus of claim 13, wherein the one or more processors are further configured to cause the first UE to:

remain in an active state for reception of the communication on the non-preferred sidelink resource.

20. The apparatus of claim 19, wherein the one or more processors are further configured to cause the first UE to:

deactivate sensing in the active state for reception of the communication on the non-preferred sidelink resource.

21. The apparatus of claim 19, wherein the one or more processors are further configured to cause the first UE to:

skip reception of one or more communications other than the communication on the non-preferred sidelink resource in the active state.

22. The apparatus of claim 13, wherein the one or more processors are further configured to cause the first UE to:

determine the non-preferred sidelink resource based at least in part on one of a half duplex constraint at the first UE, a power saving configuration at the first UE, or a combination of the half duplex constraint and the power saving configuration.

23. A method of wireless communication performed at a first user equipment (UE), comprising:

receiving, from a second UE, coordination information indicating a non-preferred sidelink resource in a sidelink resource pool of a plurality of sidelink resource pools; and transmitting a communication on the non-preferred sidelink resource based at least in part on a condition being satisfied for the communication, wherein the condition is a priority threshold for transmission of the communication on the non-preferred sidelink resource, and wherein the priority threshold is configured per sidelink resource pool of the plurality of sidelink resource pools.

24. The method of claim 23, further comprising:

transmitting, to the second UE, an indication that the first UE is to transmit the communication on the non-preferred sidelink resource.

25. The method of claim 23, wherein the priority threshold is associated with a priority of a packet of the communication.

26. The method of claim 23, wherein satisfaction of the condition for the communication is based at least in part on whether a packet delay budget of the communication is below a threshold.

27. A method of wireless communication performed at a first user equipment (UE), comprising:

transmitting, to a second UE, coordination information indicating a non-preferred sidelink resource in a sidelink resource pool of a plurality of sidelink resource pools; and receiving, from the second UE, a communication on the non-preferred sidelink resource based at least in part on a condition being satisfied for the communication, wherein the condition is a priority threshold for transmission of the communication on the non-preferred sidelink resource, and wherein the priority threshold is configured per sidelink resource pool of the plurality of sidelink resource pools.

28. The method of claim 27, wherein the condition is configured by at least one of the first UE or the second UE.

29. A non-transitory computer-readable medium storing a set of instructions for wireless communication, the set of instructions comprising:

one or more instructions that, when executed by one or more processors of a first user equipment (UE), cause the first UE to:

receive, from a second UE, coordination information that indicates a non-preferred sidelink resource in a sidelink resource pool of a plurality of sidelink resource pools; and transmit a communication on the non-preferred sidelink resource based at least in part on satisfaction of a condition for the communication, wherein the condition is a priority threshold for transmission of the communication on the non-preferred sidelink resource, and wherein the priority threshold is configured per sidelink resource pool of the plurality of sidelink resource pools.

30. A non-transitory computer-readable medium storing a set of instructions for wireless communication, the set of instructions comprising:

one or more instructions that, when executed by one or more processors of a first user equipment (UE), cause the first UE to:

transmit, to a second UE, coordination information that indicates a non-preferred sidelink resource in a sidelink resource pool of a plurality of sidelink resource pools; and receive, from the second UE, a communication on the non-preferred sidelink resource based at least in part on satisfaction of a condition for the communication, wherein the condition is a priority threshold for transmission of the communication on the non-preferred sidelink resource, and wherein the priority threshold is configured per sidelink resource pool of the plurality of sidelink resource pools.

31. The method of claim 27, further comprising:

transmitting a negative acknowledgment to a transmitter of a skipped communication associated with the non-preferred sidelink resource.

32. The method of claim 27, further comprising:

determining the non-preferred sidelink resource based at least in part on one of a half duplex constraint at the first UE, a power saving configuration at the first UE, or a combination of the half duplex constraint and the power saving configuration.

* * * * *